US012792975B1

(12) United States Patent
Sharma

(10) Patent No.: US 12,792,975 B1
(45) Date of Patent: Nov. 10, 2026

(54) ON-DEVICE AGENTIC VALIDATION VIA PERSONALIZED MODEL ENSEMBLE

(71) Applicant: U.S. Bank National Association, Minneapolis, MN (US)

(72) Inventor: Rahul Sharma, Fremont, CA (US)

(73) Assignee: U.S. Bank National Association

( * ) Notice: Subject to any disclaimer, the term of this patent is extended or adjusted under 35 U.S.C. 154(b) by 0 days.

(21) Appl. No.: 19/453,917

(22) Filed: Jan. 20, 2026

Related U.S. Application Data

(63) Continuation of application No. 19/453,768, filed on Jan. 20, 2026, and a continuation of application No. 19/453,882, filed on Jan. 20, 2026, and a continuation of application No. 19/453,838, filed on Jan. 20, 2026.

(51) Int. Cl.
*G06F 16/33* (2025.01)
*G06F 16/3329* (2025.01)
*G06N 20/20* (2019.01)

(52) U.S. Cl.
CPC ......... *G06N 20/20* (2019.01); *G06F 16/3329* (2019.01)

(58) Field of Classification Search
CPC ................ G06N 20/20; G06F 16/3329; G06F 16/33295
See application file for complete search history.

(56) References Cited

U.S. PATENT DOCUMENTS

| | | | | |
|---|---|---|---|---|
| 12,462,917 | B1 * | 11/2025 | Christopherson | G16H 20/70 |
| 2022/0108262 | A1 * | 4/2022 | Cella | G06Q 10/063118 |
| 2025/0137675 | A1 * | 5/2025 | Lessans | F24F 11/38 |
| 2025/0139378 | A1 * | 5/2025 | Durvasula | G06F 16/285 |
| 2025/0156898 | A1 * | 5/2025 | Crabtree | G06Q 30/0277 |
| 2025/0272681 | A1 * | 8/2025 | Bansal | G06Q 20/401 |
| 2025/0328948 | A1 * | 10/2025 | Roth | G06Q 30/0641 |
| 2026/0073180 | A1 * | 3/2026 | Shobe | G06N 3/006 |

* cited by examiner

*Primary Examiner* — Merilyn P Nguyen
(74) *Attorney, Agent, or Firm* — Garg Law Firm, PLLC; Rakesh Garg; Christopher Davis

(57) ABSTRACT

An agentic recommendation is generated in response to a query from an agentic model executing in a user device. Further in response to the query, a set of personalized recommendations is generated from a set of personalized models forming an ensemble of models executing in the user device. In an output corresponding to the query, the agentic recommendation is replaced with at least one personalized recommendation from the set of personalized recommendations.

20 Claims, 9 Drawing Sheets

900

ON-DEVICE AGENTIC VALIDATION VIA PERSONALIZED MODEL ENSEMBLE

BACKGROUND

The disclosure relates generally to artificial intelligence systems, and more specifically to on-device agentic validation and personalization of recommendation outputs generated by large language models. The invention further pertains to methods for continuous, privacy-preserving co-adaptation between agentic and personalized components in a mobile or edge computing environment. More specifically, the disclosure relates to on-device agentic validation via personalized model ensemble. The technical field therefore involves Artificial Intelligence (AI), AI models, Agentic AI architecture, and on-device AI infrastructures.

An on-device AI model is a computational program that run directly on a user's device (device) rather than on a remote server. Once trained, a model can perform inference (generating predictions or decisions based on new inputs) entirely within the device's processor and memory, thereby reducing latency, preserving privacy, and enabling operation without an active network connection. By embedding the trained model into the device, the device's processor executes the model's inference steps, which involve applying the learned weights to incoming data and producing a result such as a classification label, a suggestion or recommendation, or a navigation instruction.

Agentic AI can also run on-device. Agentic AI refers to computational systems that possess a degree of self-directed behavior, allowing them to set internal goals, evaluate progress toward those goals, and modify their own strategies in response to dynamic environments. Traditional AI systems typically follow explicit, externally prescribed rules or objective functions, whereas agentic AI systems are designed to develop and pursue their own objectives within defined constraints. This capability is realized through machine learning algorithms, reinforcement learning frameworks, and built-in decision-making architectures that enable continuous adaptation and autonomous problem solving.

The emergence of agentic AI has been driven by the need for more flexible, scalable solutions in domains such as autonomous robotics, intelligent personal assistants, and complex simulation environments. In these settings, fixed rule-based approaches often prove inefficient, while agentic systems can learn from interaction, discover novel solutions, and maintain performance across a variety of tasks.

Despite the rapid progress, practical deployment of agentic AI still confronts significant challenges. One major issue is ensuring that self-directed agents remain aligned with human values and operational constraints. Additionally, guaranteeing stability, convergence, and interpretability of learned policies in complex, partially observable environments remains a challenge. Consequently, there is a strong demand for novel approaches that enhance the robustness, output relevance, and transparency of agentic AI systems.

SUMMARY

The present disclosure includes inventive concepts relating generally to improving the performance of software applications, such as methods, systems, and computer programs for on-device agentic validation via personalized model ensemble. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method embodiment includes generating, from an agentic model executing in a user device, and responsive to a query, an agentic recommendation. The embodiment further includes generating, from a set of personalized models forming an ensemble of models executing in the user device, and responsive to the query, a set of personalized recommendations. The embodiment further includes replacing, in an output corresponding to the query, the agentic recommendation with at least one personalized recommendation from the set of personalized recommendations.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

At least some novel features believed characteristic of examples of inventive concepts disclosed herein are set forth in the appended claims. The inventive concepts of the instant application, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
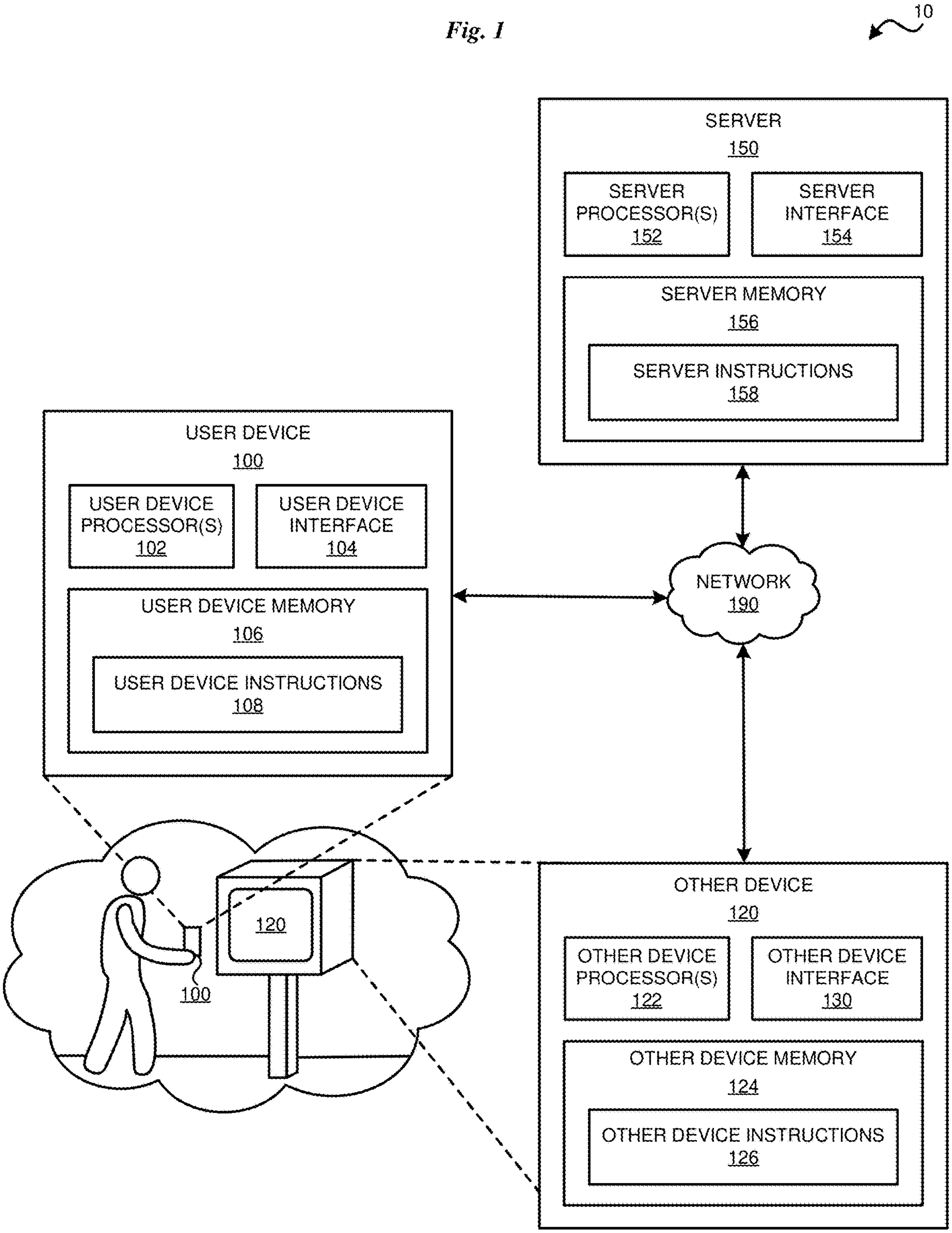
FIG. 1 depicts a block diagram of a computing environment in which an illustrative embodiment may be implemented.

Modern agentic systems-AI systems that autonomously plan, reason, and execute multi-step workflows—are increasingly deployed in personalized recommendation contexts such financial advisors and assistance. These systems leverage Large Language Models (LLMs) to generate contextual recommendations by reasoning over user history, preferences, and user context. However, deploying agentic systems in production creates a critical validation gap. Typically, traditional evaluation approaches rely on post-deployment user feedback: recommend something, observe whether user the user accepts it, then update the system. While this reactive approach is simple, it suffers from issues. First, user experiences poor recommendations before the system learns from mistakes. Second, by the time feedback arrives, the user context may have changed, making the feedback signal stale.

Meanwhile, on-device personalized models, which are smaller models trained on individual user behavioral data like click patterns, purchase history, and engagement signals, have shown success in encoding nuanced understanding of that specific user. For instance, these models can effectively capture that this user prefers mortgage information in the morning but investment advice in the evening, or that engage with video content on weekdays. This user specific intelligence exists locally but remains disconnected from agentic recommendation pipelines.

The proposed innovation advances the use on-device personalized models as real-time "quality gates" for agentic outputs before those outputs reach the user. Rather than leaning solely from user feedback after deployment, the proposed system leverages predictive signals from models that already understand the user. In doing so the proposed innovation addresses three crucial challenges:

Detecting Misalignment Before Deployment: When an agentic system generates a recommendation, there is no reliable way to assess its quality before showing it to the user. The recommendation may be technically correct but contextually inappropriate for this specific user at this specific time. Waiting for user rejection wastes the user's attention and degrades their experience. Thus, the system needs a mechanism to predict whether a recommendation will resonate with the user before deployment; that is, a predictive oracle rather than a reactive evaluator.

Systematic Adaptation Without Extensive Retraining: When agentic recommendations consistently fail in certain user contexts, the typical solution is to retrain the underlying model or fine-tune (for example, via reinforcement learning from human feedback (RLHF)). However, this approach is computationally expensive, requires substantial data collection, and results in opaque updates. The system needs a way to adapt systematically and interpretably to user specific failure patterns without costly retraining cycles.

Preventing Error Propagation in Multi-Step Workflows: Agentic systems often operate through multi-step reasoning: first identify user needs, then relevant options, then rank and present recommendations. A subtle error in one step can compound through subsequent steps. For e.g., if the system misidentifies a user's intent as seeking home loans when they need auto loans, every subsequent retrieval and ranking step operates on this faulty foundation. By the time the final recommendation reaches the user, the error is deeply embedded. Thus, the system needs principled mechanisms to detect and intervene on errors early in the reasoning chain before they cascade.

Proposed Innovation: Model-Validated Agentic Selection

This innovation presents a framework where on-device personalized models serve as predictive validators for agentic recommendations. The key insight is that these personalized models, having been trained on user-specific behavioral data, can predict user preferences with high accuracy. Rather than using them only as alternative recommendation engines, the system positions them as quality assessment oracles that evaluate agentic outputs before deployment. The framework operates through continuous comparison: when the agentic system generates a recommendation, multiple on-device personalized models simultaneously generate their predictions for the same context. High agreement signals that the agentic recommendation aligns with established user preferences-deploy it with confidence. Low agreement signals potential misalignment-either fallback to the personalized ensemble's recommendation or refine the agentic approach before trying again.

Existing approaches treat personalized models and agentic systems as separate pipeline. Ensemble methods combine multiple models but do not create feedback loops between them. On the other hand, RLHF updates model weights but provides no interpretable insight into what changed. The proposed innovation enables bi-directional learning where agentic systems and personalized models continuously inform and improve each other, all happening on-device with no cloud dependency and maintaining privacy preservation. The framework enables three progressive capabilities: (1) Using disagreement patterns to refine prompts systematically; (2) Tracking cumulative confidence across multi-step workflows to prevent error propagation; and (3) Creating mutual learning loops where both agentic and personalized systems improve from each other's successes and failures.

Contribution1: Disagreement-Driven Prompt Refinement

A prompt is the textual instruction or instruction set supplied to a model to elicit a response or output. Traditional prompt engineering is an iterative process where developers test different prompt formulations and select what works best on average across users. This approach fails to capture user-specific nuances and cannot adapt to evolving preferences. This contribution leverages dynamically refined prompts that learn from systematic disagreement patterns between agentic outputs and personalized model predictions.

Three pieces of information for each recommendation are leveraged: what the agentic system recommended, what the personalized models predicted, and whether the user ultimately accepted or rejected the recommendation. Over time, this log reveals patterns. For e.g., the system might observe that when the agentic module recommends credit card offers in the evening, personalized models consistently predict the user will reject these (preferring investment content instead), and user feedback confirms the personalized models were correct. These patterns become structured refinement signals. Rather than vaguely telling agentic system "Do better," the system generates specific prompt augmentation strings: "Note: This user engages with credit card offers primarily in morning hours. In evening contexts, prioritize investment and savings context. Historical data shows 70% of evening credit card recommendations were rejected while 85% of investment content was accepted in similar contexts" as shown in FIG. 1.

Progressive Learning: The refinement process is compositional and cumulative. Each refinement builds on previous refinements rather than replacing them. Early refinements might capture broad patterns like time-of-day preferences. As more disagreement data accumulates, refinements become increasingly specific: "In evening contexts during market volatility periods (as indicated by recent news engagement), prioritize risk-management content over growth-oriented investment advice." Crucially, these refinements are interpretable. A human expert can review the prompt history and understand exactly what adaptations occurred and why. The transparency is impossible with classical fine-tuning approaches, where improvements happen in high-dimensional parameter space.

In contrast, the proposed approach is much more efficient than traditional fine-tuning. Instead of requiring thousands of training examples to update model weights, prompt refinement operates on dozens of examples and executes in milliseconds. The agentic model itself never changes-only the instructions it receives. This means the same base agentic model can serve tens of thousands of users, each with personalized prompt augmentations to specific preferences, all without any model retraining.

Figure 3:
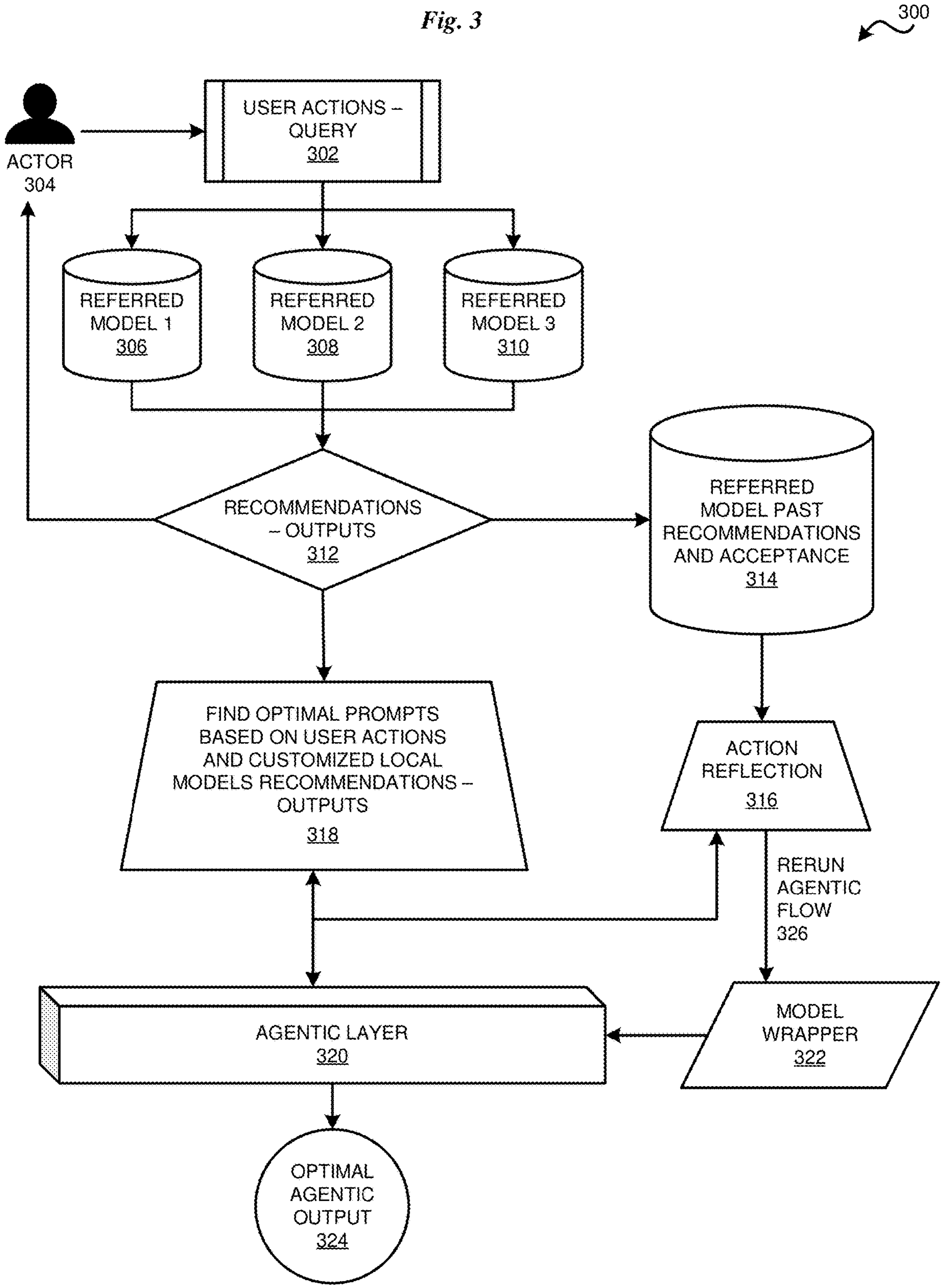
FIG. 3 depicts a flow diagram of an on-device agentic recommendation system that integrates a large language model with a personalized model ensemble to generate and validate recommendations before user exposure in accordance with an illustrative embodiment.

FIG. 3 depicts this conceptual operation. Some examples are now provided for further clarity of the operations—

Example 1: agentic module recommends credit card offers in the evening; personalized models consistently (i.e., exceeding a threshold number of times) predict the user will reject credit card offers, preferring investment. User feedback confirms-user prefers investment.

Prompt 1a:

Historical data shows 70% of evening credit card recommendations were rejected while 85% of investment recommendations were accepted in similar contexts. Recommend Financial Institution X's offers for the user.

Refined Prompt 1a: (Prompt Augmentation)

This user engages with credit card offers primarily in morning hours. In evening contexts, prioritize investment and savings context. Historical data shows 70% of evening credit card recommendations were rejected while 85% of investment recommendations were accepted in similar contexts. Recommend Financial Institution X's offers for the user.

Prompt 2a: 95% of the personalized models are predicting user will opt for investing in small cap stocks. In the past 85% of personalized models suggestion have been accepted by user. Your past suggestion about large cap stocks have been rejected by user. Please recommend stocks for user to invest in.

Refined prompt 2a: (Prompt Augmentation): 95% of the personalized models are predicting user will opt for investing in small cap stocks. In the past 85% of personalized models suggestion have been accepted by user during morning hours. Your past suggestion about large cap stocks have been rejected by user. Please recommend stocks for user to invest in.

Contribution2: Cumulative Confidence Gating for Multi-Step Workflows

The disagreement-driven refinement from Contribution 1 addresses single-step recommendations effectively. Agentic systems often operate through multi-step reasoning chains where each step's input. This introduces a new problem: errors compound. The second contribution extends the disagreement-based validation framework to multi-step workflows through cumulative confidence tracking. The key insight is that the confidence should not be reset at each step—instead, the system maintains a running assessment of how well agentic reasoning aligns with user preferences throughout the entire workflow.

At each step in a multi-step workflow, system computes an agreement score representing how closely the agentic output aligns with personalized model predictions. The score ranges from zero (complete disagreement) to one (perfect alignment). Rather than evaluating each step in isolation, the system multiplies these steps to compute cumulative confidence. For e.g., consider a three-step workflow for recommending financial products: first identify user needs, then retrieve relevant options, then rank and present recommendations. Suppose step achieves 90% agreement (the agentic system correctly identified the user is interested in home financing, and 9 out of 10 personalized models agree). Step two achieves 80% agreement (the agentic system retrieved relevant mortgage options, though personalized models suggested including some refinancing options too). Step three achieves 70% agreement (ranking priorities differ between agentic and personalized approaches). The cumulative confidence is $0.9\times0.8\times0.7=0.504$, or about 50%. This signals that while each individual step seemed reasonable, the compound uncertainty means the final recommendation may not align well with user preferences. The system can then intervene: either use personalized models' recommendations for step three or backtrace and take personalized models' suggestion from step two (including refinancing options), which may lead to a better outcome.

Intervention Strategies: The framework supports multiple intervention strategies based on confidence thresholds. If cumulative confidence drops below a critical threshold, the system abandons the current agentic path entirely and switches to personalized model recommendations as shown in FIG. 2*c*. If confidence is moderate, the system creates a hybrid path: use personalized model outputs for next step while retaining agentic reasoning for subsequent steps. If confidence remains high, continue with agentic workflow while monitoring for degradation.

This cumulative approach prevents a key failure mode: the confident wrong answer. An agentic system might generate each step with high internal confidence, unaware that its initial assumption was incorrect. By continuously validating against personalized models that understand the user's actual preferences, the approach flags divergence early. A user who initially seems to be researching home loans might be exploring investment properties, a distinction personalized models would catch from historical behavior, but agentic systems might miss from conversation alone.

Figure 4:
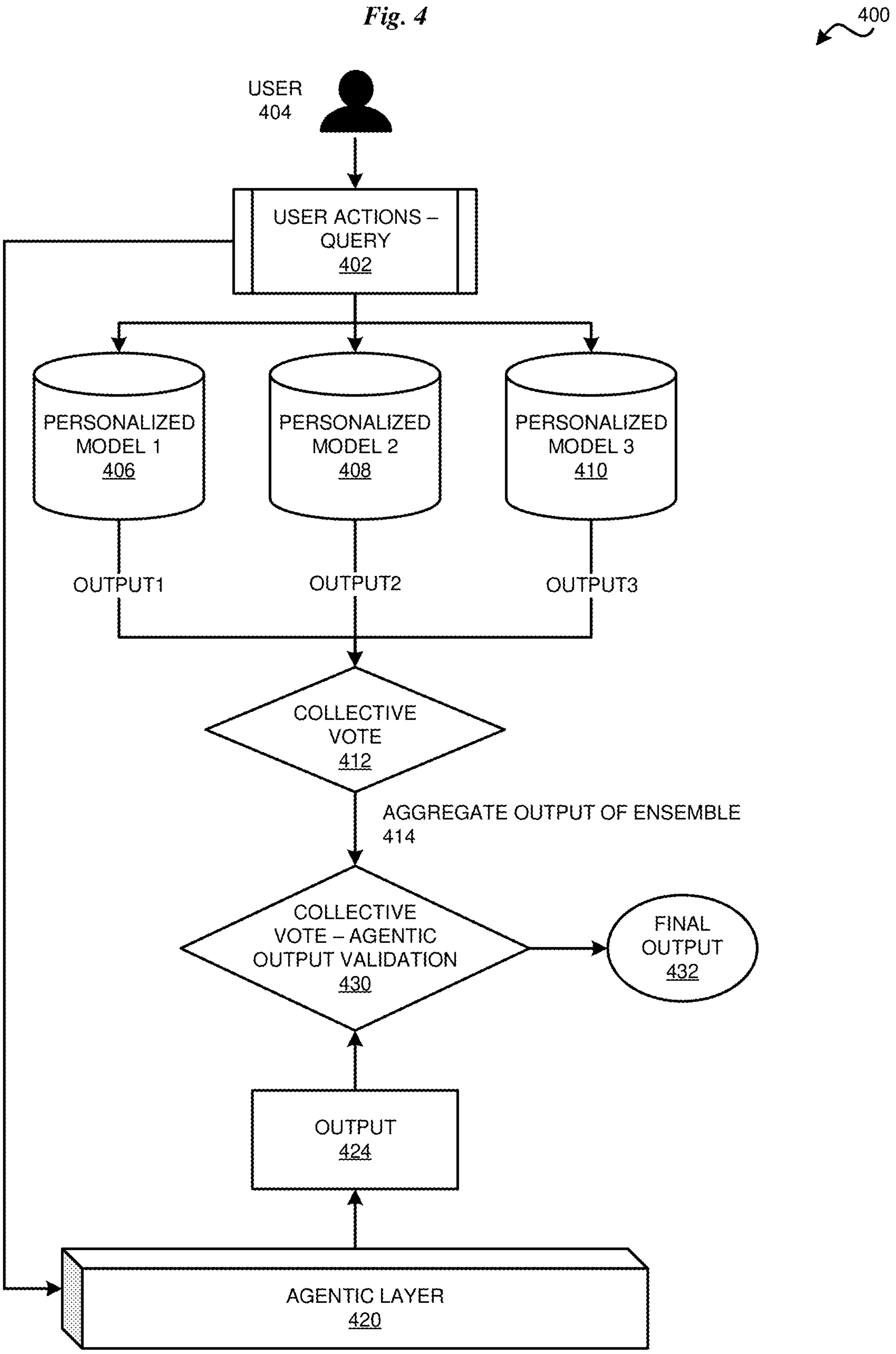
FIG. 4 depicts a process of optimal output selection in accordance with an illustrative embodiment.
Figure 5:
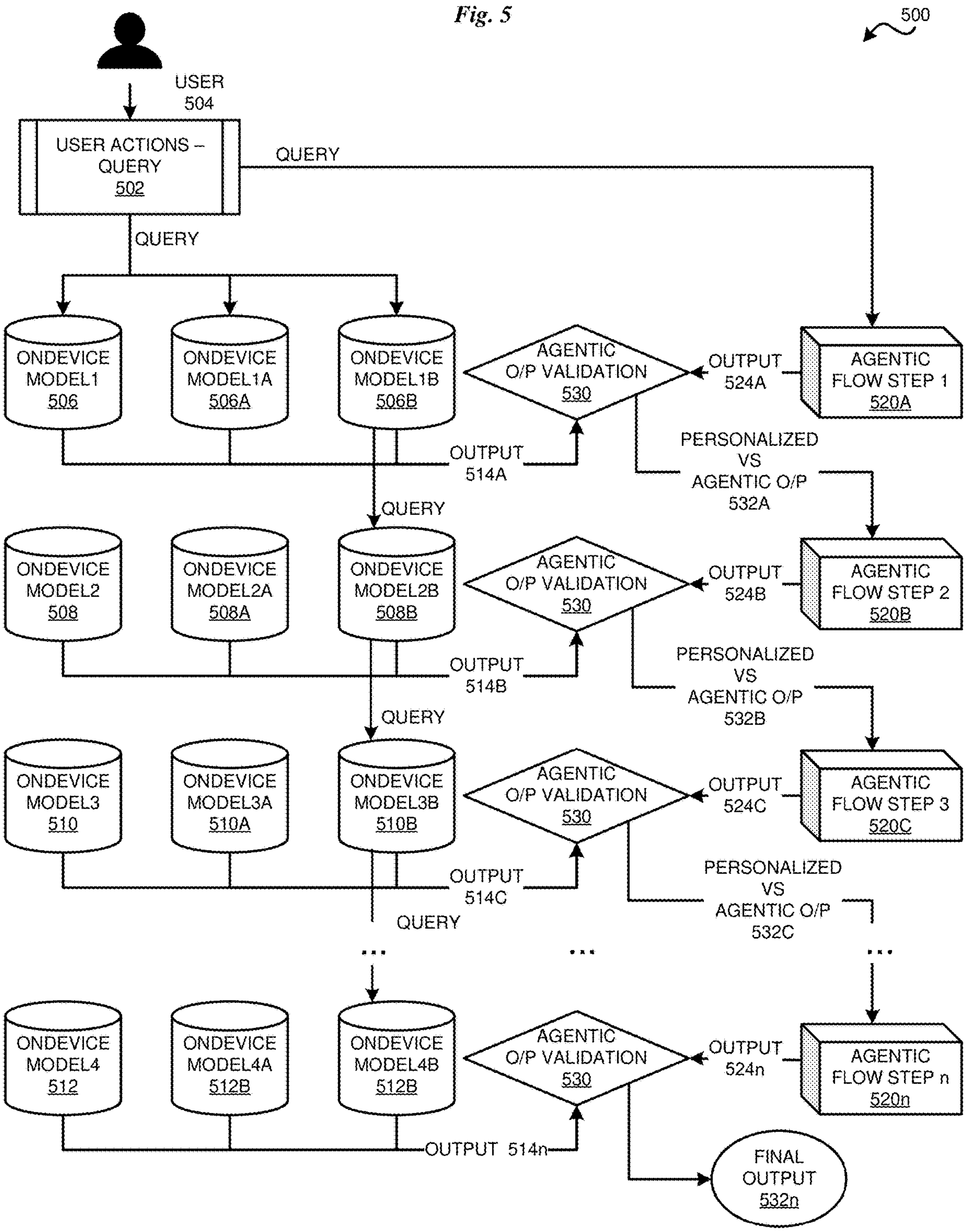
FIG. 5 depicts a process of optimal output selection in accordance with an illustrative embodiment.

FIGS. 3-5 depict this conceptual operation. Some examples are now provided for further clarity of the operations—

Prompt: Recommend useful offers for customer John Doe

Recommendation logic is configured such that Total Recommended offers=Card offers+Auto Loan offers+Home Loan offers The critical threshold for recommendations is set to 0.5 (50%)

Scenario 1: Continue with Agentic Recommendations, No Switch to Personalized Model Recommendation Agentic Recommendation Scores:

Card offers=0.9; Auto Loan offers=0.8; Home Loan offers=0.7

Cumulative Confidence=$0.9\times0.8\times0.7=0.54$ 0.54>critical threshold of 50%, therefore, continue with agentic recommendations Scenario 2: Complete Switch to Personalized Model Recommendation Card offers=0.8

Auto Loan offers=0.6

Home Loan offers=0.4

Card offers and Auto Loan offers Cumulative Confidence $0.8\times0.6=0.48$ 0.48<critical threshold of 50%, therefore, use personalized models' recommendations for all offers.

Scenario 3: Partial Switch to Personalized Model Recommendation

Card offers=0.9

Auto Loan offers=0.8

Home Loan offers=0.3

Card offers and Auto Loan offers Cumulative Confidence 0.8×0.9=0.72>50%

But Home Loan offers Confidence <30%, therefore, use personalized models' recommendations for Home Loan offers Scenario 4: Prevents Confident Wrong Answer Assume that Agentic Module generates a confidently wrong recommendation for Credit Card offers, which would lead to unnecessary Credit Score Check, which would in turn lead to a Final List of Credit Card Offers.

Instead, using the Personalized Model recommendation for Home Loan offer, would lead to Preapprovals, which would lead to Assets/Loan Check, which would lead to Final List of Home Loan Offers Contribution3: Co-Adaptation The first two contributions establish contributions establish unidirectional learning: agentic systems learn from personalized models through prompt refinement and confidence gating. But this leaves untapped value in opposite direction. Agentic systems have access to broader world knowledge, emerging trends, and sophisticated reasoning capabilities that personalized models lack. The third contribution creates bi-directional learning loops where both systems improve each other's capabilities, all happening on-device while maintaining privacy preservation. Through Contributions 1 and 2, agentic system refines prompts based on disagreement patterns and adjusts confidence based on alignment scores. Over time, the agentic system learns user-specific preferences that weren't explicitly stated.

The reverse direction is equally valuable: personalized models trained solely on historical user behavior can become overfitted to past patterns and miss emerging interests. Agentic systems, with their access to current context and world knowledge, can identify when user preferences are evolving. Specifically, when an agentic recommendation achieves high acceptance despite personalized models predicting rejection, this signals the agentic system detected something the personalized models missed-perhaps an emerging interest of preference shift. The system treats these cases as high-value training signals for updating the personalized models. Rather than trusting only explicit user feedback (which can be noisy), the system leverages the agentic module's reasoning as a form of "expert demonstration" for refining personalized models. For e.g., a user who historically engaged primarily engaged with growth stocks might start showing interest in dividend-focused investments as they approach retirement. The agentic system, reasoning from age, recent life events mentioned in conversation, and broader financial patterns, might recommend dividend stocks. Personalized models trained only on historical behavior would predict rejection. But if user accepts enthusiastically, this becomes a strong signal for updating the personalized models to reflect user's evolving preferences.

Controlled Learning Protocols: The co-adaption is carefully controlled to prevent instability. Personalized models don't blindly accept every agentic success as a training signal. Instead, the system applies several filters: the agentic recommendation must achieve both high user acceptance and represent a departure from previous patterns (otherwise it's not teaching anything new) as shown in FIG. 3, the context must be sufficiently similar future scenarios (ensuring transferability), and the agreement score between multiple personalized models before update must show consensus on the prior prediction (ensuring the update addresses systematic gaps rather than random variance). Similarly, prompt refinement for agentic systems doesn't react to every disagreement instance. The system accumulates patterns over time, requiring consistent disagreement across multiple similar contexts before triggering refinement. This prevents overfitting to individual anomalies while remaining responsive to genuine systematic misalignments.

Privacy and Efficiency Benefits: Because all learning happens on-device, no user data leave the device. The agentic model's base weights remain unchanged and shared across all users, and only the prompt augmentations are user specific. Personalized models remain completely local. This architecture enables personalization at scale with strong privacy guarantees: individual user preferences data is protected on their devices.

The computational benefits are also noteworthy. Traditional federated learning approaches require multiple rounds of gradient exchanges between devices and cloud servers. Weight-based fine-tuning requires substantial compute for backpropagation. Our approach operates entirely through prompt augmentation and light weight updates using only accepted recommendations as training signals.

Over time, the co-adaptation creates emergent capabilities that neither system possessed initially. The agentic system develops deep understanding of user-specific nuances that aren't explicitly programmed, while personalized models gain awareness of broader patterns and reasoning capabilities from the agentic module. The result is a hybrid intelligence that combines the agentic system's reasoning and world knowledge with the personalized models' deep understanding of individual user preferences. This creates recommendations that are both contextually sophisticated and personally relevant.

Figure 6:
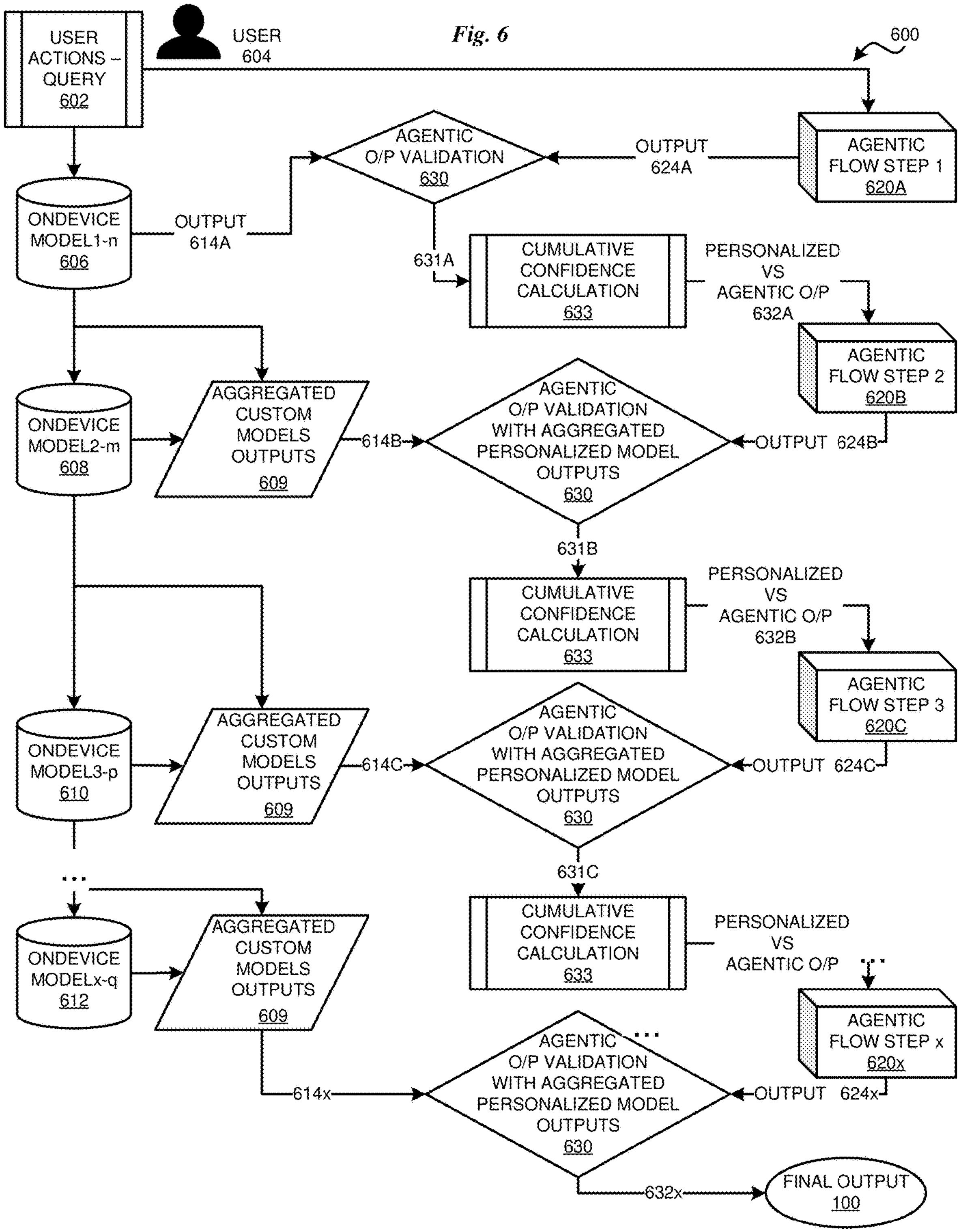
FIG. 6 depicts a process of optimal output selection in accordance with an illustrative embodiment.

FIG. 6 depicts this conceptual operation. Some examples are now provided for further clarity of the operations—

Personalized models' deep understanding of individual user preferences means these models can make contextually sophisticated and personally relevant recommendations. Combining the personalized models' deep understanding of individual user preferences with Agentic system's reasoning means hybrid intelligence.

Example 1

First Occurrence: Agentic model recommends Card Offers; Personalized on-device models recommend Home Loan Offers. User's Action: Explores Card Offers Second Occurrence: Agentic model recommends Card Offers; Personalized on-device models recommend Home Loan Offers. User's Action: Explores Card Offers Third Occurrence Third Occurrence: Agentic model recommends Card Offers; Personalized on-device models recommend Home Loan Offers. User's Action: Explores Card Offers Assuming that three occurrences is the threshold for this type of departure, departure from past user behavior pattern is established, triggering Personalized Models' refinement.

Example 2

Agentic model recommends dividend based stocks; Personalized on-device models recommend growth stocks.

Because the agentic model is configured to consider broader scope of user data, such as considers the user's age, recent life events, and broader financial patterns, the user's selection of agentic recommendation triggers the coadaptation of personalized models.

Example 3

Assume that there are 10 total Personalized Home Loan Models available.

First Occurrence: Agentic model recommends Card Offers; Personalized on-device models recommend Home Loan Offers. User's Action: Explores Card Offers. In this occurrence, it is determined that 70% of the personalized recommendations were wrong.

Second Occurrence: Agentic model recommends Card Offers; Personalized on-device models recommend Home Loan Offers. User's Action: Explores Card Offers. In this occurrence, it is determined that 60% of the personalized recommendations were wrong.

Third Occurrence: Agentic model recommends Card Offers; Personalized on-device models recommend Home Loan Offers. User's Action: Explores Card Offers. In this occurrence, it is determined that 55% of the personalized recommendations were wrong.

Because the threshold is set at 50%, in the last 3 occurrences, the error %>50%, therefore, trigger Personalized Models refinement by coadaptation.

A recommendation system is a computational framework that suggests content, products, or services to a user based on analysis of data; personalization refers to the tailoring of such suggestions to the individual characteristics or preferences of that user. The use of AI in these systems allows for context-aware predictions by learning complex patterns from historical interactions.

Traditional recommendation engines often rely on centralized servers that aggregate and analyze data from many users. Personalized recommendation systems employ large language models (LLMs) for autonomous planning, reasoning, and execution of multi-step user workflows. On-device personalized recommendation systems, include pre-trained mathematical AI model or models, that perform inference operations locally on the device. One advantage of this approach include enhanced privacy, as sensitive user data does not leave the device, which is particularly useful in certain category of applications (app, apps), such as financial applications.

Current commercial recommendation systems generate a recommendation output and rely on user feedback to evaluate recommendation quality. The illustrative embodiments recognize that this reactive paradigm results in suboptimal user experience because users first encounter potentially irrelevant or inappropriate recommendations before the system learns from subsequent feedback. Moreover, by the time feedback arrives, the user's context or preferences may have changed, rendering the signal stale.

Conventional solutions address personalization by training a separate small model on user-specific data, such as click patterns or purchase history, and deploying this model to generate recommendations. The illustrative embodiments recognize that while such personalized models can capture nuanced user preferences, they are generally static and dependent on the training data used to train the model before the model was deployed. The illustrative embodiments recognize that existing hybrid approaches either fuse the outputs of the two models at the final recommendation stage or use the personalized model solely for ranking, but they lack a mechanism to evaluate the LLM's output in real time against user-specific expectations.

An agentic reasoning chain is the internally generated sequence of computational steps that an autonomous or agentic AI system follows in identifying a goal, evaluating possible actions, and selecting a course of action that best advances the computation toward that goal. In this context, a reasoning chain is the step-by-step logical pathway linking premises to conclusions. Each link in the chain is usually represented by an inference rule, a learned model, or a symbolic representation, and the chain is evaluated, revised, or terminated in real time as information arrives.

The illustrative embodiments recognize that a further limitation of current practice is the absence of a systematic method to prevent the propagation of errors through multi-step agentic reasoning chains. When an early step in a chain misidentifies user intent, downstream steps can compound the error, producing a recommendation that is deeply misaligned with user intent. Existing methods typically rely on global confidence scores that do not capture step-wise alignment with user preference producing a "confidently wrong" output or recommendation.

In light of the above deficiencies, there remains a need for an on-device, privacy-preserving validation framework that can: (1) predict recommendation relevance before presenting the recommendation to the user (user exposure); (2) adapt agentic instructions without computationally expensive retraining which obscures the reasoning behind retrained values or output results of the retraining; and (3) mitigate error propagation in multi-step reasoning. The illustrative embodiments recognize that there exists a gap for a privacy-preserving, on-device framework that uses personalized model ensembles to validate agentic outputs, refine prompts through disagreement patterns, compute cumulative confidence across reasoning steps, and enable co-adaptation of both components. The illustrative embodiments address these needs.

The illustrative embodiments address these deficiencies of the presently available on-device recommendation methods by providing a method, product, and system for on-device agentic validation via personalized model ensemble. The various embodiments are described with respect to on-device recommendation in certain non-limiting example use-cases. An embodiment can similarly be implemented in other use cases and deliver similar improvements.

Definitions: As used herein,

A personalized model ensemble on a device is a collection of multiple machine-learning models that are stored, trained, or fine-tuned locally on a user's device. The several models of an ensemble can be trained so that different models exhibit different competencies, such as by specializing in different tasks or functions of the application in which they are deployed. The several models of an ensemble can also be combined to produce a single, more accurate or robust output for a given task. An individual model in the ensemble is typically a lightweight variant of a base model architecture (such as a small neural network, a decision tree, or a linear predictor) that has been adapted to the device's hardware constraints such as Central processing Unit (CPU), Graphics Processing Unit (GPU), memory, battery, network bandwidth, and other resources typically available to the application while executing at the device.

When two distinct models are asked to solve the same problem on the same input, they each produce a prediction or a probability distribution over possible predictions. The disagreement between the two outputs is the quantitative difference between those predictions. In other words, the disagreement is a measure of how much the two models diverge in their answer to the same question.

The disagreement can be measured or quantified in several different ways depending on a variety of factors. For example, if the models produce discrete categories or classifications as outputs, a direct comparison of the values can be used as the disagreement metric. If the models produce numerical scores or values as outputs, a difference between the values can be used as the disagreement metric. If the models produce probability distribution over classes as outputs, disagreement can be quantified using a divergence measure such as the Kullback-Leibler (KL) divergence, Jensen-Shannon divergence, or total variation distance, which can then be used as the disagreement metric. For ensembles of many models, disagreement can also be summarized by the variance or entropy of the ensemble predictions. The variance is a degree of disagreement, and higher than a threshold variance may indicate that the models are not in agreement.

Conversely, an agreement score is a quantitative measure of similarity between an agentic output and the aggregated predictions of the personalized ensemble, ranging from zero (complete disagreement) to one (perfect agreement).

Cumulative confidence is the product (multiplication) of agreement scores across successive steps of a multi-step reasoning chain.

A disagreement pattern is a systematic observable structure in the disagreements that arise between the outputs of two or more models when they are evaluated on the same dataset for a set of questions. A disagreement pattern represents how disagreement varies across groups of inputs, feature combinations, or over time.

Prompt refinement is the iterative process of adjusting the wording, structure, or content of an input (the prompt) to a model, in order to obtain more accurate, relevant, or useful outputs. For example, prompt refinement is the process of modifying the instruction set fed to the agentic AI based on systematic disagreement patterns between the agentic AI and the personalized model ensemble.

Prompt augmentation is a manner of performing prompt refinement by adding additional wording, structure or content to a prompt. "String" refers to an ordered sequence of characters that may contain a prompt portion and other information used to influence or instruct a model.

Coadaptation (or co-adaptation) according to the illustrative embodiments refers to a bi-directional learning loop that lets the agentic AI and a model in the on-device personalized model ensemble improve the output quality of one another without cloud-based retraining. The agentic system uses a personalized model from the ensemble as a real-time validation source (validation oracle). When the agentic output disagrees with an output from the ensemble, the coadaptation system of an embodiment refines the agentic model's prompt(s) resulting in a change in a desired change-direction in the agentic model's subsequent outputs. Conversely, when a personalized model's prediction is rejected while the agentic output is accepted, the basis of that choice, such as a new user preference, is fed back into the personalized models as a training signal.

This mutual, on-device coadaptation according to the illustrative embodiments enables each component of the coadaptation system—the agentic model and the personalized model ensemble—to evolve or improve their respective outputs based on the other's successes and failures while preserving privacy. The coadaptation process of an illustrative embodiment is therefore a privacy-preserving, on-device, bi-directional learning process that continuously informs and improves both the agentic and personalized models.

A fallback recommendation is a recommendation generated solely by the personalized ensemble, used when agentic confidence falls below a threshold confidence level.

The term 'output corresponding to the query' refers to the recommendation or set of recommendations presented to the user in response to a user query.

The term 'replacing' a recommendation in an output refers to the act of substituting one recommendation with another, for example, the agentic recommendation in the output with one or more personalized recommendations, or vice versa.

An agentic recommendation is the output generated by an agentic model in response to a user query.

A personalized recommendation is the output generated by one or more personalized models within a personalized model ensemble in response to a user query.

The term 'correspondence' between recommendations means the degree of similarity or agreement between the content of an agentic recommendation and the content of a personalized recommendation as evaluated by an agreement score or other similarity metric.

The term 'degree of correspondence' refers to a numerical value that quantifies the correspondence, such as an agreement score, ranging from zero to one.

The term 'threshold degree of correspondence' refers to a predetermined numerical value, typically expressed as a percentage or decimal, that is used to decide whether correspondence is sufficient for replacing the agentic recommendation.

The term 'threshold' refers to a pre-set numeric boundary used to decide whether a confidence value, correspondence value, or any other value is adequate for a particular action.

The term 'function of an application' refers to the specific operation, service, or module of an application relative to which the agentic model and the personalized model ensemble perform their operations as described herein.

The term 'pattern of accepting a recommendation' refers to a systematic trend observed in user interactions where a user consistently chooses recommendations from one source or model in response to a group of queries similar to a current query.

The following is a description of a specific example implementation or experiment of the proposed architecture according to one embodiment. The description of the implementation illustrates the principle of operation of the embodiment using certain example use cases, example data, and corresponding results from the proposed architecture. All trademarks related to any specifically named examples, uses, characters, entities, values, numbers, limits, tools, techniques, models, steps, and operations described or referenced herein belong to their respective owners. The specific examples, uses, characters, entities, values, numbers, limits, tools, techniques, models, steps, and operations are not intended to be limiting. From this disclosure, those of ordinary skill in the art will be able to conceive many other variations of these description artifacts and the same are contemplated within the scope of the illustrative embodiments. The description of the implementation is as follows—

The illustrative embodiments provide a system for on-device agentic validation via personalized model ensemble. The system according to the illustrative embodiments comprises:

- an on-device agentic module that implements an agentic AI or agentic model, and accepts a user request and generates a recommendation using a large language model;
- a personalized ensemble module that hosts one or more personalized models and produces predictions for the same request as sent to the agentic module;
- a validator module that compares the agentic output to the ensemble predictions, computes an agreement score, and updates a cumulative confidence metric;
- a prompt manager that stores and updates prompt augmentations derived from disagreement patterns; and an update manager that monitors user acceptance of the agentic AI output, ensemble output, or both. The update manager triggers updates to personalized models based on co-adaptation criteria.

The agentic module is implemented as an LLM capable of multi-step reasoning, such as GPT-4 or a proprietary model of comparable capability. The module receives an instruction prompt that may be augmented by the prompt manager.

The personalized ensemble module contains multiple lightweight models, each instantiated as a shallow neural network or a gradient-boosted tree model trained on local behavioral data. The ensemble may be formed by averaging predictions or by voting.

The validator module executes on the device, computing the agreement score by measuring overlap between the agentic recommendation and the ensemble's prediction set.

The prompt manager is a lightweight database that stores textual augmentations. When disagreement is detected, the manager generates a new prompt fragment that incorporates context such as time-of-day preferences or recently expressed interests.

The update manager maintains a log of user actions. When a user accepts a recommendation that the personalized ensemble predicted low likelihood, and the disagreement score exceeds a threshold, the manager updates the personalized models with the new data point, subject to consistency checks.

Functional Operation

When a user issue is received, the agentic module generates a candidate recommendation. Simultaneously, each personalized model in the ensemble generates its own prediction for the same request. The validator module compares the agentic recommendation to the ensemble predictions, computing an agreement score. If the agreement score exceeds an upper threshold (e.g., 0.80), the validator permits the agentic recommendation to be presented to the user. If the agreement score falls below a lower threshold (e.g., 0.40), the validator selects the ensemble's recommendation as a fallback.

For multi-step workflows, the validator maintains a cumulative confidence metric. After each step, the validator multiplies the current step's agreement score by the cumulative confidence from preceding steps. If the cumulative confidence falls below a preset threshold (e.g., 0.50), the validator aborts the current chain and switches to the personalized ensemble's output for the remaining steps.

The prompt manager records the agreement score and, if the agreement score falls below the lower threshold, the prompt manager generates a prompt augmentation reflecting the disagreement context. The prompt augmentation is concatenated to the base prompt for future agentic invocations.

The update manager monitors user acceptance signals. If a user accepts an agentic recommendation that had a low agreement score and the disagreement pattern has occurred consistently across multiple contexts, the update manager adds the new interaction as a training example to each personalized model, after verifying that the change is not anomalous.

Illustrative Example

Consider a user who prefers mortgage information in the morning and investment advice in the evening. The personalized models, trained on the user's historical clicks or selections, predict that a morning request for "financial advice" should be a mortgage recommendation. The agentic module, given a prompt "Provide financial advice", generates an investment recommendation. The validator computes an agreement score of 0.20, falling below the lower threshold. Consequently, the system presents the personalized mortgage recommendation to the user. The user accepts the mortgage recommendation, generating a training signal that confirms the personalized model's prediction. The update manager records this interaction, and no change is made to the personalized models, but the prompt manager records a new prompt augmentation: "When the user requests financial advice in the morning, prioritize mortgage content." Future morning requests will include this augmentation, steering the agentic module toward mortgage recommendations.

ALTERNATE EMBODIMENTS

The agentic module may be implemented as a rule-based planner rather than a large language model, in which case the validator still computes agreement scores between rule outputs and ensemble predictions.

The personalized ensemble may comprise heterogeneous model types, such as decision trees, support vector machines, or lightweight transformers, with aggregation achieved via weighted voting.

The fallback mechanism can be extended to a multi-level hierarchy, where a secondary personalized ensemble with broader coverage is consulted when both the agentic and primary personalized models exhibit low confidence.

The update manager may incorporate reinforcement learning from user interaction signals, updating personalized models incrementally on-device without full retraining.

Four alternate embodiment scopes are now provided—

Embodiment 1 presents a core architecture for on-device recommendations. This embodiment implements the core on-device architecture in which an agentic AI system operates in conjunction with a personalized model ensemble. The system is comprised of the following components, each hosted locally on the user device:

Agentic Module—an LLM-based engine that receives a user request, internally reasons through a multi-step plan, and produces a single recommendation or action.

Personalized Ensemble Module—a collection of lightweight predictive models that have been trained on the device using the user's historical interaction data (clicks, purchases, engagement signals, and the like). One or more models in the ensemble produces a recommendation for the same request as was sent to the agentic module.

Validator Module—receives the agentic recommendation and the set of ensemble predictions, computes an agreement score that measures similarity between the agentic output and the ensemble consensus, and determines whether the agentic recommendation is acceptable for deployment.

Prompt Manager—stores a base prompt and, for other embodiments described herein, would generate augmentations; but in this embodiment containing the core architecture, the prompt manager simply forwards the base prompt to the agentic module.

Update Manager—records user acceptance or rejection, but in this embodiment does not alter any model weights in this embodiment.

The agentic module generates an agentic model recommendation; the validator compares the agentic model recommendation to the recommendation from the ensemble; if the agreement score exceeds a pre-defined upper threshold, the agentic model recommendation is released; if the agentic model recommendation falls below a lower threshold, the system falls back to the ensemble's aggregated recommendation. All computation occurs locally, preserving user privacy and eliminating any cloud dependence.

Embodiment 2 presents the above described core architecture and includes prompt refinement. Building upon the core architecture of Embodiment 1, this embodiment adds a prompt refinement capability. The prompt manager in this embodiment now monitors, for each user request, the following data set: the agentic recommendation, the ensemble's prediction set, and the user's final acceptance or rejection.

When a systematic disagreement pattern is detected, e.g., the agentic model repeatedly recommends (e.g., for a threshold number of times) content that the ensemble predicts with higher than a threshold confidence and the user consistently rejects that agentic model's recommendation, this embodiment generates a prompt augmentation that is appended to the base prompt for subsequent agentic invocations. The augmentation is a human-readable, interpretable instruction (e.g., "Prioritize mortgage offers in the morning; defer investment content until evening") that guides the agentic model toward user-specific preferences without altering the agentic model's internal weights. The validator continues to use the agreement score to gate deployment, but the prompt refinement loop provides an additional, lightweight adaptation path.

Embodiment 3 presents prompt refinement of embodiment 2 and also includes error-propagation prevention. This embodiment extends embodiment 2 by incorporating a cumulative confidence mechanism that mitigates error propagation in multi-step agentic reasoning. The agentic module is now capable of executing a sequence of reasoning steps (identify intent→retrieve options→rank→recommend). For each step i, the validator module computes an agreement score $A_i$ between the agentic step output and the ensemble predictions. The system maintains a cumulative confidence C computed as the product of all $A_i$ values up to the current step. If C falls below a threshold before the final recommendation is produced, the system aborts the remaining agentic steps and returns the ensemble's aggregated recommendation to the user. This approach ensures that a single early misstep cannot cascade into a final recommendation that is poorly aligned with user preferences.

Embodiment 4 presents the co-adaptation of the ensemble models. This embodiment incorporates the features of embodiment 3 and adds a bi-directional co-adaptation loop between the agentic and personalized components. The update manager now monitors two data streams:

Agentic-to-Ensemble updates—When the agentic recommendation is accepted by the user despite a low ensemble agreement score, the system records this event as a high-value training signal. After a configurable number of such events, the personalized models are incrementally updated (e.g., via a lightweight online learning step) to incorporate the newly validated user preference, thereby reducing future disagreement.

Ensemble-to-Agentic updates—Persistent disagreement patterns (i.e., exceeding a threshold number of occurrences) identified by the prompt manager are translated into structured prompt augmentations that are fed back to the agentic module, refining the agentic model's behavior without requiring full retraining.

Both update paths operate entirely on-device, preserving privacy and ensuring that the agentic AI and personalized ensemble continuously evolve together, each improving the other's predictive fidelity over time.

Thus, the illustrative embodiments provide a real-time, on-device validation architecture that couples a large-language-model-based agentic system with a local ensemble of lightweight personalized models. By computing an agreement score between the agentic output and the ensemble predictions, the system gates recommendation deployment, thereby preventing the propagation of errors across multi-step reasoning chains through a cumulative confidence metric. Additionally, systematic disagreement patterns are used to generate interpretable prompt augmentations that refine the agentic model without altering its weights, and a bi-directional co-adaptation loop updates the personalized models based on agentic successes. These mechanisms collectively improve the accuracy, robustness, and adaptability of the recommendation engine while preserving user privacy.

End of example implementation or experiment description.

FIG. 1 depicts a block diagram of a computing environment in which an illustrative embodiment may be implemented. The computing environment, labeled and referred to as system 10, includes user device 100, other device 120, and server 170 connected to a network. System 10 is configured to load and execute at least some of the computer code involved in performing the inventive methods, such as server instructions 158, which include the server-side computer program instructions of an embodiment, user device instructions 108, which include the user device-side computer program instructions of an embodiment, and other device instructions 126, which include the other device-side computer program instructions of an embodiment, as may be needed to perform the dynamic adaptation of identity related user interface.

User device 100 is a device used by a user that can be used as part of processes described herein. User device 100 can include one or more aspects described elsewhere herein such as in reference to computing environment 800 of FIG. 8. In many examples, user device 100 is a personal computing device, such as a smart phone, tablet, laptop computer, or desktop computer. But device 100 need not be so limited and may instead encompass other devices used by a user as part of processes described herein. In the illustrated example, user device 100 can include a user device processor set 102, a user device interface set 104, and a user device memory set 106, among other components.

The user device processor set 102 is a set of one or more processors. One or more processors are components of user device 100 that execute instructions, such as instructions that obtain data, process the data, and provide output based on the processing. The user device processor set 102 can include one or more aspects described below in relation to the processor set 812 of FIG. 8.

The user device interface set 104 is a set of one or more interfaces, which are one or more components of user device 100 that facilitate receiving input from and providing output to something external to user device 100. The user device interface set 104 can include one or more aspects described below in relation to the interface set 818 of FIG. 8.

User device memory set 106 is a set of one or more memory components, which are components of user device 100 configured to store instructions and data for later retrieval and use. User device memory set 106 can include one or more aspects described below in relation to memory 814 of FIG. 8. As illustrated, user device memory set 106 stores user device instructions 108 and other suitable user device code.

User device instructions 108 are a set of instructions that, when executed by the user device processor set 102, cause the user device processor set 102 to perform an operation described herein. In examples, instructions 108 can be those of a mobile application (e.g., that may be obtained from a mobile application store, such as the APPLE APP STORE or the GOOGLE PLAY STORE). The mobile application can provide a user interface for receiving user input from a user and acting in response thereto. User interface 104 can further provide output to the user. In some examples, client instructions 108 are instructions that cause a web browser of user device 100 to render a web page associated with a process described herein. The web page may present information to the user and be configured to receive input from the user and take actions in response thereto.

Other device 120 may be a self-service kiosk, a computer terminal, a dedicated transactions terminal—such as an electronic payment terminal, an automated customer interaction machine or device—such as an Automated Teller Machine (ATM), and the like.

In the illustrated example, other device 120 includes an other device processor set 122, an other device memory set 124, and an other device interface set 130.

The other device processor set 122 is a set of one or more components of other device 120 that execute instructions, such as instructions that obtain data, process the data, and provide output based on the processing. The other device processor set 122 can include one or more aspects described below in relation to the processor set 812 of FIG. 8.

Other device memory set 124 is a set of one or more components of other device 120 configured to store instructions and data for later retrieval and use. Other device memory 120 can include one or more aspects described below in relation to memory 814 of FIG. 8. Other device memory 120 can store other device instructions 126.

Other device instructions 126 are a set of instructions that, when executed by the processor set 122, cause the processor set 122 to perform one or more operations described elsewhere herein.

The other device interface set 130 are one or more components of other device 120 that facilitate receiving input from and providing output to something external to other device 120. The one or more other device interfaces 130 can include one or more aspects described below in relation to the one or more interfaces 818 of FIG. 8.

Server 150 is a server device that functions as part of one or more processes described herein. In the illustrated example, server 150 includes a server processor set 152, a server interface set 154, and a server memory set 150, among other components.

Server processor set 152 is a set of one or more processors that are components of the server 150 that execute instructions, such as instructions that obtain data, process the data, and provide output based on the processing. The server processor set 152 can include one or more aspects described below in relation to the processor set 812 of FIG. 8.

The server interface set 154 is a set of one or more components of the server 150 that facilitate receiving input from and providing output to something external to the server 150. The server interface set 154 can include one or more aspects described below in relation to the one or more interfaces 818 of FIG. 8.

Server memory set 150 is a collection of one or more components of the server 150 configured to store instructions and data for later retrieval and use. The server memory set 150 can include one or more aspects described below in relation to the memory 814 of FIG. 8. Server memory 150 can store server instructions 158.

Server instructions 158 are instructions that, when executed by one or more processors pf processor set 152, cause the processor set 152 to perform one or more operations described elsewhere herein.

Network 190 is a set of devices that facilitate communication from a sender to a destination, such as by implementing communication protocols. Example networks 190 include local area networks, wide area networks, intranets, and the Internet.

Figure 2:
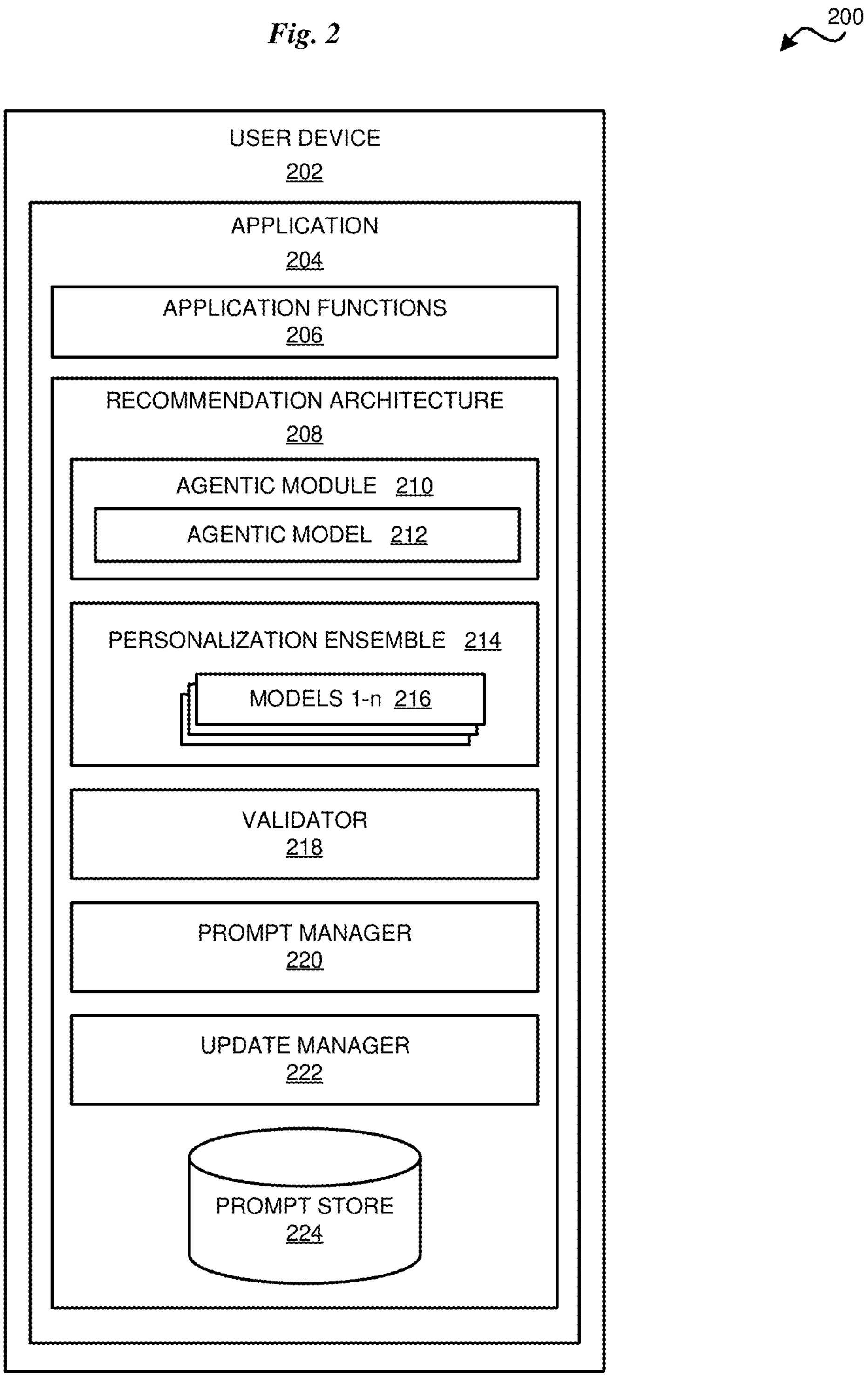
FIG. 2 depicts an example architecture for on-device agentic validation via personalized model ensemble in accordance with an illustrative embodiment.

FIG. 2 depicts an example architecture for on-device agentic validation via personalized model ensemble in accordance with an illustrative embodiment. Architecture 200 depicts a block diagram of an on-device personalized recommendation system, as described herein.

User device 202 is an example of the device described herein, and represents the physical hardware that hosts the application and stores local data. Application 204 is the user-facing software layer that receives user actions and displays recommendations. A user interacts with application 204 by sending user queries to execute application functions 206.

Recommendation architecture 208 orchestrates the overall process for on-device agentic validation via personalized model ensemble, as described herein. Agentic module 210 implements agentic model 212, which is a model that receives prompts, generates the agentic recommendations, and applies augmented prompts for recommendation improvements, as described herein.

Personalization ensemble 214 is a personalization recommendation ensemble, as described herein. Personalization ensemble 214 hosts a collection of any number (1-*n*) of local personalized models 216. Each model 216 is capable of generating a prediction or recommendation for a request, and ensemble 214 is configured to output an aggregated ensemble output as a personalized ensemble prediction or recommendation for the user. Personalization ensemble 214 generates aggregate ensemble prediction or recommendation that is used for on-device agentic validation via personalized model ensemble, by validator 218, prompt manager 220, and update manager 222, using prompt store 224, as described earlier. Not all components and operations depicted in architecture 200 need be implemented in all embodiment, as described herein with respect to the various embodiments earlier.

FIG. 3 depicts a flow diagram of an on-device agentic recommendation system that integrates a large language model with a personalized model ensemble to generate and validate recommendations before user exposure in accordance with an illustrative embodiment. Diagram 300 illustrates how user queries are processed, how the system evaluates agreement between the agentic output and personalized model predictions, and how prompt refinements are derived from user acceptance data.

The process begins with block 302 (user actions-query) where a user 304 supplies a natural-language request to the device. Blocks 306, 308, and 310 (referred model 1, referred model 2, and referred model 3, respectively) denote individual personalized models within an on-device ensemble, each contributing a prediction (recommendation). Block 312 (recommendations—outputs) represents the output generated by the ensemble. Block 314 (referred model past recommendations and acceptance) captures historical outputs of the personalized models and the user's acceptance or rejection signals. Block 316 (action reflection) records the user's interaction with the recommendation, such as acceptance, rejection, or further query.

Block 318 (find optimal prompts based on user actions and customized local models recommendations-outputs) computes an optimal prompt by analyzing disagreement patterns between the agentic output and the personalized model ensemble, and by incorporating the user's acceptance history. Block 320 (agentic layer) comprises a large language model that produces a contextual recommendation based on the query and internal knowledge.

Block 322 (model wrapper) operates as a prompt manager and adjusts the instruction set fed to the agentic layer 320 to better align future outputs with the user 304's preferences. Block 324 (optimal agentic output) is the refined recommendation that results from the updated prompt, delivered to user 304. Operation 326 (rerun agentic flow) is a loop that restarts when disagreement between the agentic output and the personalized ensemble output exceeds a threshold, prompting the system to re-generate a recommendation with the augmented prompt.

FIG. 4 depicts a process of optimal output selection in accordance with an illustrative embodiment. Process 400 illustrates the operation of optimal output selection based on comparison of aggregated vote of personalized models versus the agentic layer recommendation.

The process begins at block 402 (user action-query) where user 404 provides a query input. The query input is directed to block 420 (agentic layer) as well as blocks 406, 408, and 410 (an ensemble of on-device personalized models 1, 2, and 3, respectively, which produce outputs 1, 2, and 3, respectively). Block 412 is an ensemble operation where the outputs of the personalized models 406, 408, and 410 are aggregated to determine aggregate output 414 of the ensemble.

Block 420 (agentic layer) produces block 424 (output), which is the agentic layer's recommendation in response to the user query. Block 430 (collective vote-agentic output validation performed by the validator, e.g., validator 218 in FIG. 2) validates output 424 using aggregate output 414 of the ensemble and produces final output 432. Optimal output 432 is generated by applying any of the strategies described herein, as may be suitable in a given circumstance of disagreement between output 424 and aggregate output 414.

FIG. 5 depicts a process of optimal output selection in accordance with an illustrative embodiment. Process 500 illustrates the operation of optimal output selection for each agentic step in the multistep plan of operation of the agentic model based on a step-wise comparison of aggregated vote of personalized models versus the agentic layer recommendation.

The process begins at block 502 (user action-query) where user 504 provides a query input. The query input is directed to the agentic layer as well as the ensemble of personalized models. Blocks 506, 506A, and 506B (an ensemble of on-device personalized models 1, 1A, and 1B, respectively) are models trained to process step 1 of the multistep operation. The outputs of the personalized models 506, 506A, and 506B are aggregated to determine aggregate output 514A of the ensemble in a manner described herein.

Block 520A (agentic layer's processing of step 1 in the agentic multistep flow) produces output 524A, which is the agentic layer's recommendation in response to step 1 in the multistep flow generated corresponding to the user query. Block 530 (agentic output validation performed by the validator, e.g., validator 218 in FIG. 2) validates output 524A using aggregate output 514A of the ensemble and produces step 1 output 532A. output 532A is either the agentic output 524A or the ensemble output 514A based on the considerations described herein and applied at block 530. Output 532A is supplied to the agentic layer as the final recommendation for step 1. This prevents error cascading or error compounding, as described herein.

Blocks 508, 508A, and 508B (an ensemble of on-device personalized models 2, 2A, and 2B, respectively) are models trained to process step 2 of the multistep operation. The outputs of the personalized models 508, 508A, and 508B are aggregated to determine aggregate output 514B of the ensemble in a manner described herein.

Block 520B (agentic layer's processing of step 2 in the agentic multistep flow) produces output 524B, which is the agentic layer's recommendation in response to step 2 in the multistep flow generated corresponding to the user query. Block 530 (agentic output validation performed by the validator, e.g., validator 218 in FIG. 2) validates output 524B using aggregate output 514B of the ensemble and produces step 2 output 532B. output 532B is either the agentic output 524B or the ensemble output 514B based on the considerations described herein and applied at block 530. Output 532B is supplied to the agentic layer as the final recommendation for step 2. This prevents error cascading or error compounding, as described herein.

Blocks 510, 510A, and 510B (an ensemble of on-device personalized models 3, 3A, and 3B, respectively) are models trained to process step 3 of the multistep operation. The outputs of the personalized models 510, 510A, and 510B are aggregated to determine aggregate output 514C of the ensemble in a manner described herein.

Block 520C (agentic layer's processing of step 3 in the agentic multistep flow) produces output 524C, which is the agentic layer's recommendation in response to step 3 in the multistep flow generated corresponding to the user query. Block 530 (agentic output validation performed by the validator, e.g., validator 218 in FIG. 2) validates output 524C using aggregate output 514C of the ensemble and produces step 3 output 532C. output 532C is either the agentic output 524C or the ensemble output 514C based on the considerations described herein and applied at block 530. Output 532C is supplied to the agentic layer as the final recommendation for step 3. This prevents error cascading or error compounding, as described herein.

The process continues in this manner for (n−1) steps of the multistep process. At step n-Blocks 512, 512A, and 512B (an ensemble of on-device personalized models n, nA, and nB, respectively) are models trained to process step n of the multistep operation. The outputs of the personalized models 512, 512A, and 512B are aggregated to determine aggregate output **514*n*** of the ensemble in a manner described herein.

Block **520*n* (agentic layer's processing of step n in the agentic multistep flow) produces output 524*n*, which is the agentic layer's recommendation in response to step n in the multi step flow generated corresponding to the user query. Block 530 (agentic output validation performed by the validator, e.g., validator 218 in FIG. 2) validates output 524*n* using aggregate output 514*n* of the ensemble and produces step n output 532*n*. output 532*n* is either the agentic output 524*n* or the ensemble output 514*n* based on the considerations described herein and applied at block 530. Output 532*n* is output to user 504** as the final recommendation for the entire multistep agentic operation. This prevents error cascading or error compounding, as described herein.

FIG. 6 depicts a process of optimal output selection in accordance with an illustrative embodiment. Process 600 illustrates the operation of optimal output selection for each agentic step in the multistep operation of the agentic model based on a step-wise comparison of cumulative aggregated vote of personalized models versus the agentic layer recommendation.

The process begins at block 602 (user action-query) where user 604 provides a query input. The query input is directed to the agentic layer as well as the ensemble of personalized models.

Block 606 (an ensemble of on-device personalized models 1-n respectively) are models trained to process step 1 of the multistep operation. The outputs of the personalized models 606 are aggregated to determine aggregate output 614A of the ensemble in a manner described herein. Block 620A (agentic layer's processing of step 1 in the agentic multistep flow) produces output 624A, which is the agentic layer's recommendation in response to step 1 in the multistep flow generated corresponding to the user query. Blocks 630 and 633 operate together as the validator, e.g., validator 218 in FIG. 2, and validate output 624A using aggregate output 614A of the ensemble. Output 631A from block 630 is either the agentic output 624A or the ensemble output 614A for the current step based on the considerations described herein and applied at block 630. Output 631A is supplied to cumulative confidence calculation module 633, which determines whether the cumulative confidence (the product of the various confidence values over all the recommendations from all the steps executed thus far in the multistep operation) is within the defined threshold, as described herein. Output 632A is sent to the agentic layer as the final recommendation for step 1. This prevents error cascading or error compounding, and also prevents a "confidently wrong" answer, as described herein.

Block 608 (an ensemble of on-device personalized models 2-m respectively) are models trained to process step 2 of the multistep operation. The outputs of the personalized models at a step, such as the personalized models 608, are aggregated with the outputs of the personalized models of the previous step, such as the personalized models 606, by an ensemble output aggregator function at block 609. Block 609 determines aggregate output 614B of the ensemble in a manner described herein. Block 620B (agentic layer's processing of step 2 in the agentic multistep flow) produces output 624B, which is the agentic layer's recommendation in response to step 2 in the multistep flow generated corresponding to the user query. Blocks 630 and 633 operate together as the validator, e.g., validator 218 in FIG. 2, and validate output 624B using aggregate output 614B of the ensemble. Output 631B from block 630 is either the agentic output 624B or the ensemble output 614B for the current step based on the considerations described herein and applied at block 630. Output 631B is supplied to cumulative confidence calculation module 633, which determines whether the cumulative confidence (the product of the various confidence values over all the recommendations from all the steps executed thus far in the multistep operation) is within the defined threshold, as described herein. Output 632B is sent to the agentic layer as the final recommendation for step 2. This prevents error cascading or error compounding, and also prevents a "confidently wrong" answer, as described herein.

Block 610 (an ensemble of on-device personalized models 3-p respectively) are models trained to process step 3 of the multistep operation. The outputs of the personalized models at a step, such as the personalized models 610, are aggregated with the outputs of the personalized models of the previous step, such as the personalized models 608, by an ensemble output aggregator function at block 609. Block 609 determines aggregate output 614C of the ensemble in a manner described herein. Block 620C (agentic layer's processing of step 3 in the agentic multistep flow) produces output 624C, which is the agentic layer's recommendation in response to step 3 in the multistep flow generated corresponding to the user query. Blocks 630 and 633 operate together as the validator, e.g., validator 218 in FIG. 2, and validate output 624C using aggregate output 614C of the ensemble. Output 631C from block 630 is either the agentic output 624C or the ensemble output 614C for the current step based on the considerations described herein and applied at block 630. Output 631C is supplied to cumulative confidence calculation module 633, which determines whether the cumulative confidence (the product of the various confidence values over all the recommendations from all the steps executed thus far in the multistep operation) is within the defined threshold, as described herein. Output 632C is sent to the agentic layer as the final recommendation for step 3. This prevents error cascading or error compounding, and also prevents a "confidently wrong" answer, as described herein.

The process continues in this manner for (x−1) steps of the multistep process. At step x-Block 612 (an ensemble of on-device personalized models x-q respectively) are models trained to process step x of the multistep operation. The outputs of the personalized models at a step, such as the personalized models 612, are aggregated with the outputs of the personalized models of the previous step by an ensemble output aggregator function at block 609. Block 609 determines aggregate output 614*x* of the ensemble in a manner described herein. Block 620*x* (agentic layer's processing of step x in the agentic multistep flow) produces output 624*x*, which is the agentic layer's recommendation in response to step x in the multistep flow generated corresponding to the user query. Block 630 operates as the validator, e.g., validator 218 in FIG. 2, and validates output 624*x* using aggregate output 614*x* of the ensemble. Output 632*x* from block 630 is either the agentic output 624*x* or the ensemble output 614*x* for the last step based on the considerations described herein and applied at block 630. Output 632*x* is sent to user 604 as the final recommendation in response to the query. This prevents error cascading or error compounding, and also prevents a "confidently wrong" answer, as described herein.

Figure 7:
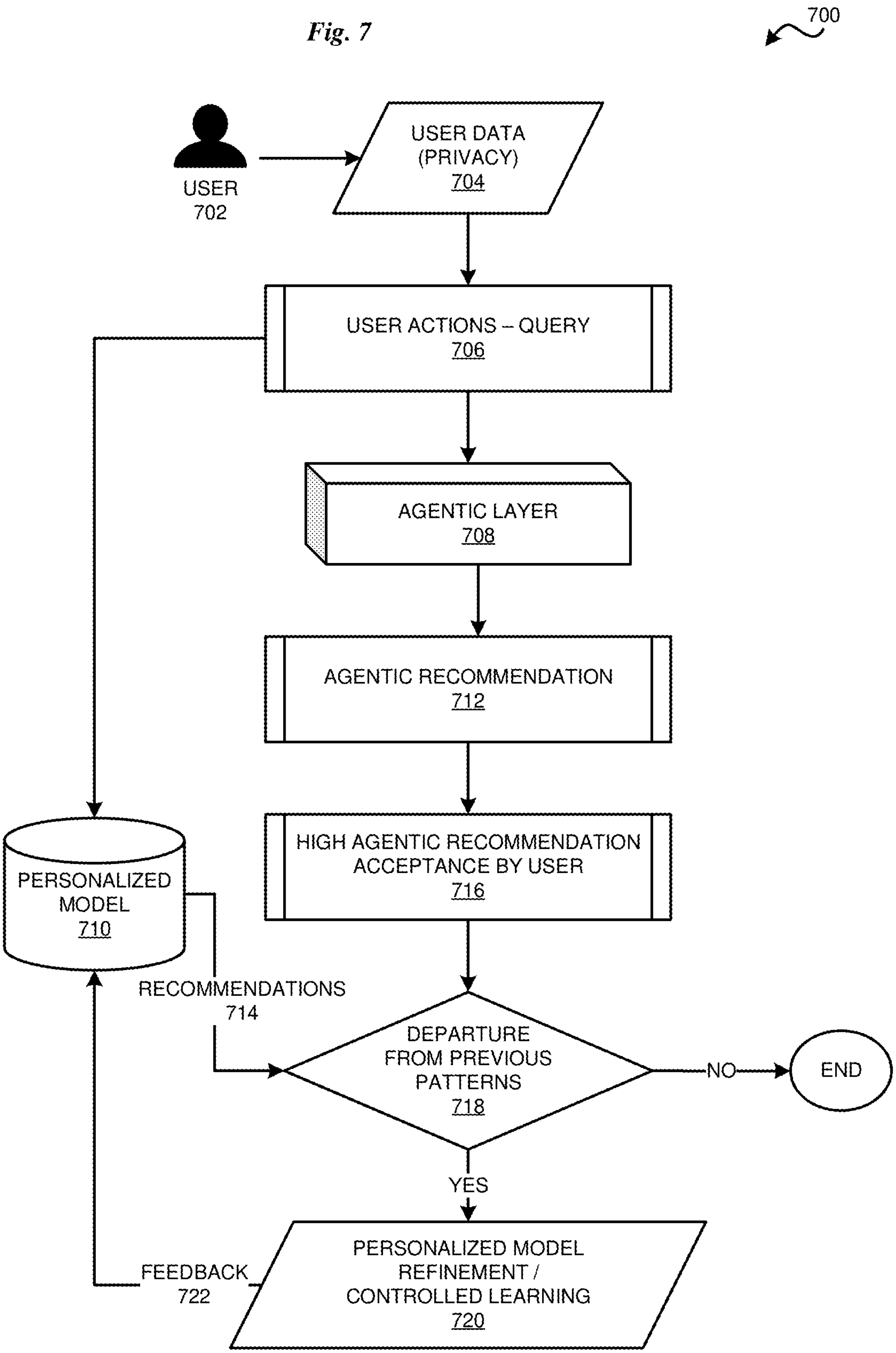
FIG. 7 depicts a feedback-controlled coadaptation learning loop in accordance with an illustrative embodiment.

FIG. 7 depicts a feedback-controlled coadaptation learning loop in accordance with an illustrative embodiment. Process 700 detects departures from prior user behavior patterns, updates a personalized model, and delivers refined agentic recommendations while preserving privacy.

The process builds or augments on-device user data 704 based on user 702's past interactions, while maintaining the privacy of user data, when user 702 sends query 706. Query 706 is sent to agentic layer 708, which hosts the agentic model, and to ensemble 710 of personalized models. Agentic layer 708 produces agentic recommendation 712 in response to query 706. Ensemble 710 produces recommendations 714 in response to query 706.

At block 716, a user input accepts the agentic recommendation 712. Block 718 determines whether selecting agentic recommendation 712 in preference to ensemble recommendations 714 indicates, for a preset threshold number of times, a departure from previous pattern of user behavior. If the departure is indicated ("Yes" path of block 718), the process of coadaptation is triggered at block 720, which provides feedback 722 to ensemble 710, and feedback 722 is used to retrain one or more personalized models in the ensemble to align their recommendation with the agentic recommendation. If no departure is indicated ("No" path of block 718), process 700 ends thereafter.

Figure 8:
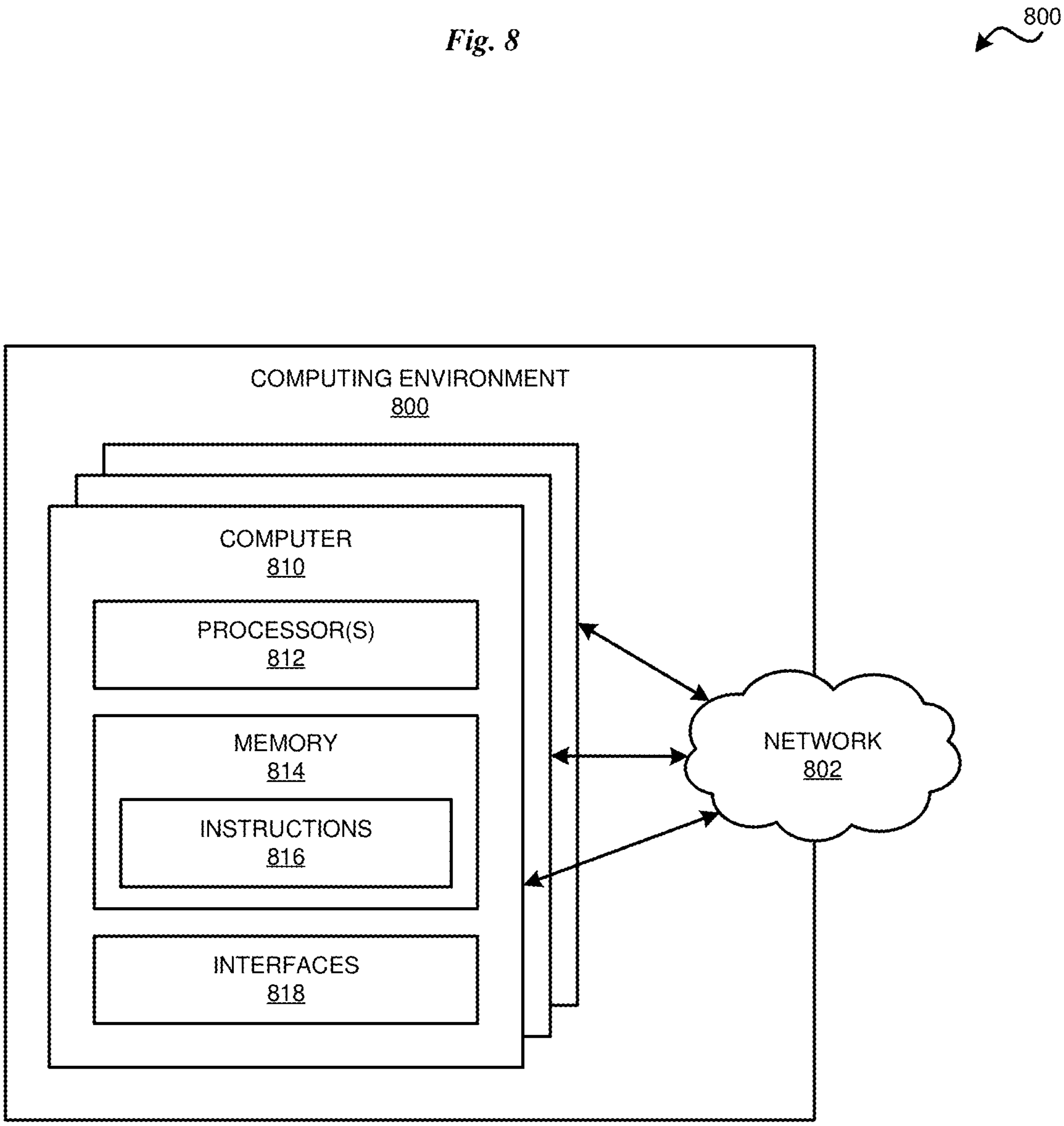
FIG. 8 depicts a data processing environment in which aspects of the present disclosure may be implemented.

FIG. 8 depicts a data processing environment 20 in which aspects of the present disclosure may be implemented.

Computing environment 800 is a set of one or more virtual or physical computers 810 that individually or in cooperation achieve tasks, such as implementing one or more aspects described herein. Computers 810 have components that cooperate to cause output based on input. Example computers 810 include desktops, servers, mobile devices (e.g., smart phones and laptops), wearables, virtual reality devices, augmented reality devices, expanded reality devices, spatial computing devices, virtualized devices, other computers, or combinations thereof. In particular example implementations, computing environment 800 includes at least one physical computer.

Computing environment 800 may specifically be used to implement one or more aspects described herein. In some examples, one or more of computers 810 may be implemented as a user device, such as mobile device and others of computers 810 may be used to implement aspects of a machine learning framework useable to train and deploy models exposed to the mobile device or provide other functionality, such as through exposed application programming interfaces.

Computing environment 800 can be arranged in any of a variety of ways. Computers 810 can be local to or remote from other computers 810 of environment 800. Computing environment 800 can include computers 810 arranged according to client-server models, peer-to-peer models, edge computing models, other models, or combinations thereof.

In many examples, computers 810 are communicatively coupled with devices internal or external to computing environment 800 via network 802. Network 802 is a set of devices that facilitate communication from a sender to a destination, such as by implementing communication protocols. Example networks 802 include local area networks, wide area networks, intranets, or the Internet.

In some implementations, computers 810 can be general-purpose computing devices (e.g., consumer computing devices). In some instances, via hardware or software configuration, computers 810 can be special purpose computing devices, such as servers able to practically handle large amounts of client traffic, machine learning devices able to practically train machine learning models, data stores able to practically store and respond to requests for large amounts of data, other special purposes computers, or combinations thereof. The relative differences in capabilities of different kinds of computing devices can result in certain devices specializing in certain tasks. For instance, a machine learning model may be trained on a powerful computing device and then stored on a relatively lower powered device for use. Such relatively low powered device may nonetheless be specially configured for such inference tasks so that it performs inference faster or more efficiently than a standard desktop or laptop computer.

Many example computers 810 include a processor set 812, memory set 814, and interface set 818. Such components can be virtual, physical, or combinations thereof.

The processor set 812 is a set of one or more processors. The processors are components that execute instructions, such as instructions that obtain data, process the data, and provide output based on the processing. The processor set 812 often (collectively or individually) obtain instructions and data stored by the memory set 814. The processors of the processor set 812 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the processor set 812 includes at least one physical processor implemented as an electrical circuit. Example providers or designers of processors 812 include INTEL, AMD, QUALCOMM, TEXAS INSTRUMENTS, and APPLE.

Memory 814 is a collection of components configured to store instructions 816 and data for later retrieval and use. Instructions 816 can, when executed by the one or more processors of processor set 812, cause execution of one or more operations that implement aspects described herein. In many examples, memory 814 is a non-transitory computer readable medium, such as random-access memory, read only memory, cache memory, registers, portable memory (e.g., enclosed drives or optical disks), mass storage devices, hard drives, solid state drives, other kinds of memory, or combinations thereof.

The interface set 818 is a set of one or more 8 components that facilitate receiving input from and providing output to something external to computer 810, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors such as those using the Global Positioning System), other input components, or combinations thereof (e.g., a touch sensitive display). The interface set 818 can include one or more components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as according to WI-FI, cellular, BLUETOOTH, ZIGBEE, or other protocols). One or more of the one or more interfaces 818 can facilitate connection of computing environment 800 to network 890.

Computers 810 can include any of a variety of other components to facilitate performance of operations described herein. Example components include one or more power units (e.g., batteries, capacitors, power harvesters, or power supplies) that provide operational power, one or more busses to provide intra-device communication, one or more cases or housings to encase one or more components, other components, or combinations thereof.

Figure 9:
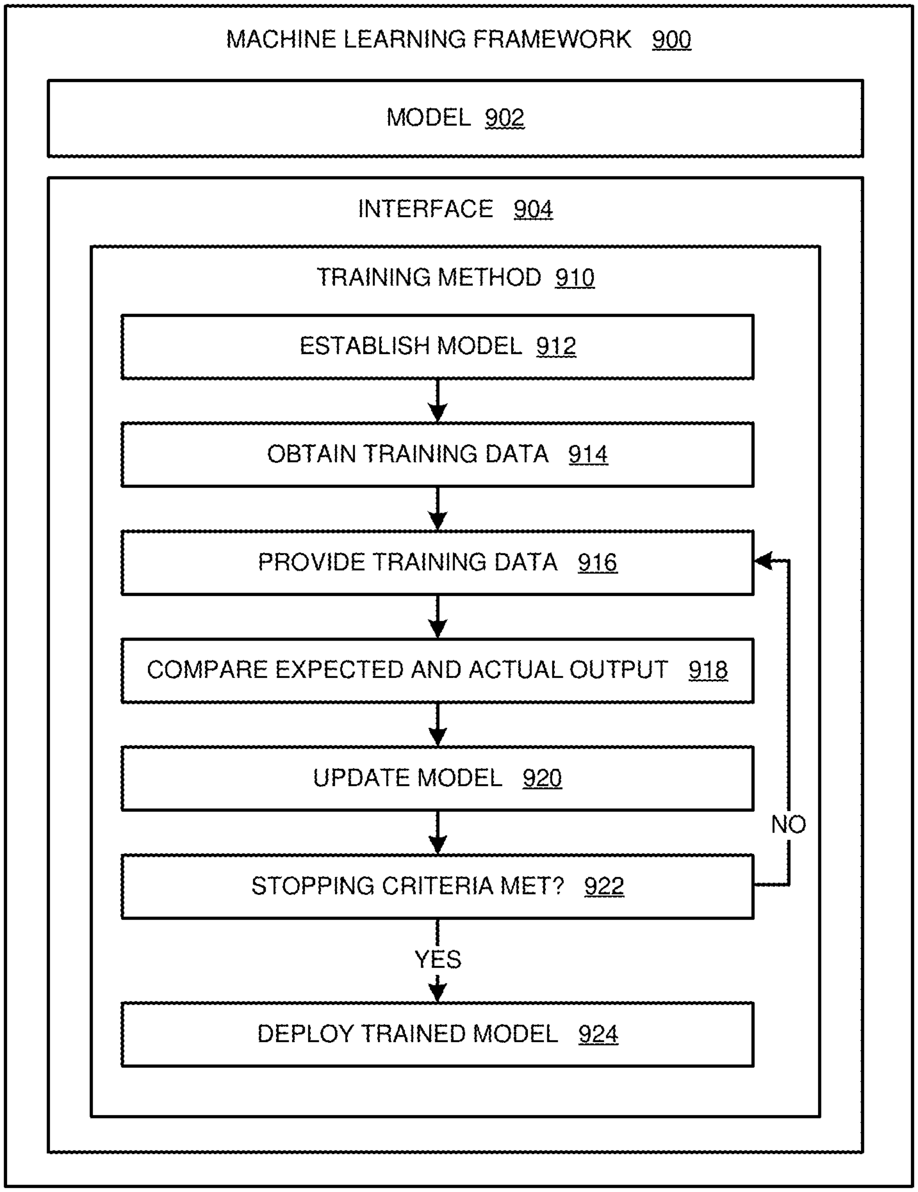
FIG. 9 depicts a configuration for machine learning in which aspects of the present disclosure may be implemented.

FIG. 9 illustrates an example machine learning framework 900 that techniques described herein may benefit from or improve on. A machine learning framework 900 is a collection of software and data that implements artificial intelligence trained to provide output, such as predictive data, based on input. Examples of artificial intelligence that can be implemented with machine learning way include neural networks (including recurrent neural networks), language models (including so-called "large language models"), generative models, natural language processing models, adversarial networks, decision trees, Markov models, support vector machines, genetic algorithms, others, or combinations thereof. A person of skill in the art having the benefit of this disclosure will understand that these artificial intelligence implementations need not be equivalent to each other and may instead select from among them based on the context in which they will be used. Machine learning frameworks 900 or components thereof are often built or refined from existing frameworks, such as TENSORFLOW by GOOGLE, INC. or PYTORCH by the PYTORCH community.

The machine learning framework 900 can include one or more models 902 that are the structured representation of learning and an interface 904 that supports use of the model 902.

The model 902 can take any of a variety of forms. In many examples, the model 902 includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the model 902 can include a representation of memory (e.g., providing long short-term memory functionality). Where the set includes more than one model 902, the models 902 can be linked, cooperate, or compete to provide output.

The interface 904 can include software procedures (e.g., defined in a library) that facilitate the use of the model 902, such as by providing a way to establish and interact with the model 902. For instance, the software procedures can include software for receiving input, preparing input for use (e.g., by performing vector embedding, such as using Word2Vec, BERT, or another technique), processing the input with the model 902, providing output, training the model 902, performing inference with the model 902, fine tuning the model 902, other procedures, or combinations thereof.

In an example implementation, interface 904 can be used to facilitate a training method 910 that can include operation 912. Operation 912 includes establishing a model 902, such as initializing a model 902. The establishing can include setting up the model 902 for further use (e.g., by training or fine tuning). The model 902 can be initialized with values. In examples, the model 902 can be pretrained. Operation 914 can follow operation 912. Operation 914 includes obtaining training data. In many examples, the training data includes pairs of input and desired output given the input. In supervised or semi-supervised training, the data can be prelabeled, such as by human or automated labelers. In unsupervised learning the training data can be unlabeled. The training data can include validation data used to validate the trained model 902. Operation 916 can follow operation 914. Operation 916 includes providing a portion of the training data to the model 902. This can include providing the training data in a format usable by the model 902. The framework 900 (e.g., via the interface 904) can cause the model 902 to produce an output based on the input. Operation 918 can follow operation 916. Operation 918 includes comparing the expected output with the actual output. In an example, this can include applying a loss function to determine the difference between expected and actual. This value can be used to determine how training is progressing. Operation 920 can follow operation 918. Operation 920 includes updating the model 902 based on the result of the comparison. This can take any of a variety of forms depending on the nature of the model 902. Where the model 902 includes weights, the weights can be modified to increase the likelihood that the model 902 will produce correct output given an input. Depending on the model 902, backpropagation or other techniques can be used to update the model 902. Operation 922 can follow operation 920. Operation 922 includes determining whether a stopping criterion has been reached, such as based on the output of the loss function (e.g., actual value or change in value over time). In addition or instead, whether the stopping criterion has been reached can be determined based on a number of training epochs that have occurred or an amount of training data that has been used. In some examples, satisfaction of the stopping criterion can include If the stopping criterion has not been satisfied, the flow of the method can return to operation 914. If the stopping criterion has been satisfied, the flow can move to operation 922. Operation 922 includes deploying the trained model 902 for use in production, such as providing the trained model 902 with real-world input data and produce output data used in a real-world process. The model 902 can be stored in memory 814 of at least one computer 810, or distributed across memories of two or more such computers 810 for production of output data (e.g., predictive data).

Application of Techniques

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries or packages (e.g., that provide functions for obtaining, processing, and presenting data, such as may be obtained using a package manager like PIP or CONDA), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT by MICROSOFT or CODE LLAMA by META).

In some examples, large language models can be used to understand natural language, generate natural language, or perform other tasks. Examples of such large language models include CHATGPT or other flagship models (GPT-4o, o1, o3, or others as released) by OPENAI, a LLAMA model by META, a CLAUDE model by ANTHROPIC, a GEMINI model by GOOGLE, others, or combinations thereof. Such models can be fine-tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

In addition to the depicted components of system 10 in FIG. 1, system 10 can also include many other components including, but not limited to—a public cloud, a private cloud, a gateway, a cloud orchestration module, a computer (which may further include specialized processing circuitry, cache, a communication fabric, a volatile memory, a persistent storage including an operating system, and peripheral devices), Internet of Things (IoT) sensors, a remote database, and a container set.

A device contemplated herein may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database. As is well understood in the art of computer technology, and depending upon the technology, performance of a computer-implemented method may be distributed among multiple computers or between multiple locations. Where the detailed discussion in this disclosure is focused on a single computer, such focus is only to keep the presentation as simple as possible. A computer or device contemplated herein may be located in or participate in a cloud, even though it is not shown in a cloud. On the other hand, a computer or device is not required to participate in a cloud except to any extent as may be affirmatively indicated.

A processor device described herein may be of any type now known or to be developed in the future, may be distributed over multiple packages or coordinated integrated circuit chips, and may implement multiple processor threads or multiple processor cores. Cache memory may be located in the processor chip package(s) and is typically used for data or code that should be available for rapid access by the threads or cores running on a processor. Cache memories are typically organized into multiple levels depending upon relative proximity to the processing circuitry. Alternatively, some, or all, of the cache for the processor set may be located "off chip." In some computing environments, a processor may be designed for working with qubits and performing quantum computing.

Computer readable program instructions are typically loaded onto a computing device to cause a series of operational steps to be performed by a processor set of the computing device and thereby effect a computer-implemented method, such that the instructions thus executed will instantiate the methods specified in flowcharts or narrative descriptions of computer-implemented methods included in this document (collectively referred to as "the inventive methods"). These computer readable program instructions are stored in various types of computer readable storage media, such as cache and the other storage media discussed below. The program instructions, and associated data, are accessed by the processor set to control and direct performance of the inventive methods. At least some of the instructions for performing the inventive methods may be stored in a persistent storage.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the embodiments. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment, either locally at a data processing system or over a data network, within the scope of the illustrative embodiments. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment within the scope of the illustrative embodiments. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits or lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments each have been described by stating their individual advantages, respectively, present application is not limited to a particular combination thereof. To the contrary, such embodiments may also be combined in any way and number according to the intended deployment of present embodiments without losing their beneficial effects.

Techniques herein may be applicable to improving technological processes of a financial institution, such as technological aspects of transactions (e.g., resisting fraud, entering loan agreements, transferring financial instruments, or facilitating payments). Although technology may be related to processes performed by a financial institution, unless otherwise explicitly stated, claimed inventions are not directed to fundamental economic principles, fundamental economic practices, commercial interactions, legal interactions, or other patent ineligible subject matter without something significantly more.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage training of a machine learning model with a diverse set of training data. Further, the policy can encourage testing for and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method, comprising:

executing locally on a user device, a plurality of models comprising an agentic model and an ensemble of models, the ensemble of models comprising a set of personalized models, wherein the agentic model is delivered to the user device pre-trained with unchanging weights, and wherein each personalized model in the set of personalized models is trained locally on the user device on a different function of an application present on the user device;

generating, responsive to a query, from the agentic model, and using an agentic prompt corresponding to the query, an agentic recommendation;

generating, from the ensemble of models executing in the user device, and responsive to the query, a set of personalized recommendations;

presenting for a selection input, and responsive to the query, the agentic recommendation and a personalized recommendation from the set of an ensemble recommendation;

receiving a selection of the agentic recommendation as the selection input;

triggering, responsive to the selection input a retraining of the set of personalized models, the retraining causing a first personalized model in the set of personalized models to produce a second personalized recommendation that is similar to the agentic recommendation.

2. The method of claim 1, wherein the ensemble recommendation is formed using a combination of the personalized recommendations from the set of personalized recommendations.

3. The method of claim 1, wherein personalized recommendations from at least a threshold number of personalized models in the set of personalized models are within a threshold degree of agreement relative to the ensemble recommendation.

4. The method of claim 1, wherein the selection is a part of a pattern of selections, the pattern comprising at least a threshold number of selections, and wherein the pattern of selections is distinct from a past pattern of selections.

5. The method of claim 4, wherein a context of selections in the past pattern of selections is similar to a context of selections in the pattern of selections by at least a threshold degree of similarity.

6. The method of claim 1, wherein prior to the retraining the first personalized model produces a first personalized recommendation that has a less than a threshold degree of correspondence with the agentic recommendation.

7. The method of claim 6, wherein second personalized recommendation that has a greater than the threshold degree of correspondence with the agentic recommendation.

8. The method of claim 1, further comprising:

performing the retraining on the user device and using only user-specific data available on the user device.

9. A computer program product comprising a set of one or more non-transitory computer readable storage media, and program instructions collectively stored on the one or more non-transitory computer readable storage media, the program instructions executable by a set of one or more processors to cause the set of one or more processors to perform operations comprising:

executing locally on a user device, a plurality of models comprising an agentic model and an ensemble of models, the ensemble of models comprising a set of personalized models, wherein the agentic model is delivered to the user device pre-trained with unchanging weights, and wherein each personalized model in the set of personalized models is trained locally on the user device on a different function of an application present on the user device;

generating, responsive to a query, from the agentic model, and using an agentic prompt corresponding to the query, an agentic recommendation;

generating, from the ensemble of models, and responsive to the query, a set of personalized recommendations;

presenting for a selection input, and responsive to the query, the agentic recommendation and a personalized recommendation from the set of an ensemble recommendation;

receiving a selection of the agentic recommendation as the selection input;

triggering, responsive to the selection input a retraining of the set of personalized models, the retraining causing a first personalized model in the set of personalized models to produce a second personalized recommendation that is similar to the agentic recommendation.

10. The computer program product of claim 9, wherein the ensemble recommendation is formed using a combination of the personalized recommendations from the set of personalized recommendations.

11. The computer program product of claim 9, wherein personalized recommendations from at least a threshold number of personalized models in the set of personalized models are within a threshold degree of agreement relative to the ensemble recommendation.

12. The computer program product of claim 9, wherein the selection is a part of a pattern of selections, the pattern comprising at least a threshold number of selections, and wherein the pattern of selections is distinct from a past pattern of selections.

13. The computer program product of claim 12, wherein a context of selections in the past pattern of selections is similar to a context of selections in the pattern of selections by at least a threshold degree of similarity.

14. The computer program product of claim 9, wherein prior to the retraining the first personalized model produces a first personalized recommendation that has a less than a threshold degree of correspondence with the agentic recommendation.

15. The computer program product of claim 14, wherein second personalized recommendation that has a greater than the threshold degree of correspondence with the agentic recommendation.

16. The computer program product of claim 9, the operations further comprising:

performing the retraining on the user device and using only user-specific data available on the user device.

17. The computer program product of claim 9, wherein the stored program instructions are stored in a computer readable storage device in a data processing system, and wherein the stored program instructions are transferred over a network from a remote data processing system.

18. The computer program product of claim 9, wherein the stored program instructions are stored in a computer readable storage device in a server data processing system, and wherein the stored program instructions are downloaded in response to a request over a network to a remote data processing system for use in a computer readable storage device associated with the remote data processing system, the operations further comprising:

metering a use of the program instructions associated with the request; and generating an invoice based on the use.

19. A system comprising a set of one or more processors and one or more non-transitory computer readable storage media, and program instructions collectively stored on the one or more non-transitory computer readable storage media, the program instructions executable by the set of one or more processors to cause the processor to perform operations comprising:

executing locally on a user device, a plurality of models comprising an agentic model and an ensemble of models, the ensemble of models comprising a set of personalized models, wherein the agentic model is delivered to the user device pre-trained with unchanging weights, and wherein each personalized model in the set of personalized models is trained locally on the user device on a different function of an application present on the user device;

generating, responsive to a query, from the agentic model, and using an agentic prompt corresponding to the query, an agentic recommendation;

generating, from the ensemble of models, and responsive to the query, a set of personalized recommendations;

presenting for a selection input, and responsive to the query, the agentic recommendation and a personalized recommendation from the set of an ensemble recommendation;

receiving a selection of the agentic recommendation as the selection input;

triggering, responsive to the selection input a retraining of the set of personalized models, the retraining causing a first personalized model in the set of personalized models to produce a second personalized recommendation that is similar to the agentic recommendation.

20. The system of claim 19, wherein the ensemble recommendation is formed using a combination of the personalized recommendations from the set of personalized recommendations.

* * * * *